US010221756B2

(12) United States Patent
Music et al.

(10) Patent No.: US 10,221,756 B2
(45) Date of Patent: Mar. 5, 2019

(54) SYSTEM FOR AN EXHAUST GAS AFTERTREATMENT SYSTEM AND SUPPORT STRUCTURE

(71) Applicant: General Electric Company, Schenectady, NY (US)

(72) Inventors: Nathan Synnott Music, Erie, PA (US); Taylor Duane Gray, Erie, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 199 days.

(21) Appl. No.: 15/140,797

(22) Filed: Apr. 28, 2016

(65) Prior Publication Data

US 2016/0237871 A1    Aug. 18, 2016

Related U.S. Application Data

(63) Continuation-in-part of application No. 14/339,474, filed on Jul. 24, 2014, now Pat. No. 9,359,930.

(51) Int. Cl.
*F01N 3/28*       (2006.01)
*F02B 37/00*      (2006.01)
*B60K 13/04*      (2006.01)
*F01N 13/18*      (2010.01)

(52) U.S. Cl.
CPC .............. *F02B 37/00* (2013.01); *B60K 13/04* (2013.01); *F01N 13/1805* (2013.01); *F01N 13/1822* (2013.01); *F01N 2590/08* (2013.01); *Y02T 10/144* (2013.01)

(58) Field of Classification Search
CPC ........ F01N 3/28; F01N 2570/10; F02B 37/00; B60K 13/04
See application file for complete search history.

(56) References Cited

U.S. PATENT DOCUMENTS

| | | | |
|---|---|---|---|
| 5,921,080 A | 7/1999 | Ulmet et al. | |
| 2009/0293467 A1* | 12/2009 | Boeckenhoff | F01N 3/021 60/324 |
| 2010/0031644 A1* | 2/2010 | Keane | B60K 13/04 60/295 |
| 2010/0083644 A1 | 4/2010 | Biedler et al. | |
| 2011/0005853 A1 | 1/2011 | Kamiya | |
| 2011/0039461 A1* | 2/2011 | White | F01N 3/2803 440/89 H |
| 2011/0167807 A1 | 7/2011 | Mitsuda | |
| 2012/0167558 A1 | 7/2012 | Svihla et al. | |
| 2012/0273648 A1 | 11/2012 | Maske et al. | |
| 2013/0125524 A1* | 5/2013 | Plummer | F01N 3/0222 60/39.5 |

(Continued)

FOREIGN PATENT DOCUMENTS

| | | | | |
|---|---|---|---|---|
| EP | 2444619 A1 * | 4/2012 | ......... | F01N 13/1822 |
| EP | 2518290 A1 | 4/2012 | | |

(Continued)

*Primary Examiner* — Patrick Maines
(74) *Attorney, Agent, or Firm* — McCoy Russell LLP

(57) ABSTRACT

Various systems are provided for an exhaust aftertreatment system that includes a support platform, a plurality of isolated legs coupled to the support platform, a plurality of catalysts arranged in parallel with one another and supported above the support platform by the plurality of isolated legs, and an aftertreatment outlet manifold coupled above the plurality of catalysts.

10 Claims, 13 Drawing Sheets

(56) References Cited

U.S. PATENT DOCUMENTS

2013/0213726 A1    8/2013   Okada
2016/0040578 A1*   2/2016   Lorenz .................. F01N 3/2878
                                                          60/299

FOREIGN PATENT DOCUMENTS

JP    2006320969 A    11/2006
WO    2007066024 A1   6/2007
WO    2011087819 A2   7/2011

* cited by examiner

SYSTEM FOR AN EXHAUST GAS AFTERTREATMENT SYSTEM AND SUPPORT STRUCTURE

CROSS-REFERENCE TO RELATED APPLICATIONS

This application is a continuation-in-part from U.S. application Ser. No. 14/339,474 entitled "SYSTEM FOR AN EXHAUST GAS AFTERTREATMENT SYSTEM AND SUPPORT STRUCTURE," filed Jul. 24, 2014, the entirety of which is hereby incorporated by reference for all purposes.

BACKGROUND

Technical Field

Embodiments of the subject matter disclosed herein relate to an engine, engine components, and an engine system, for example.

Discussion of Art

Engines may utilize an exhaust aftertreatment system to control regulated exhaust gas effluent or emissions. In some examples, the exhaust aftertreatment system may be suspended horizontally above the engine with a support structure mounted to a main frame, or block, of the engine or may be supported by a structure that is bolted to the platform supporting the engine. Additionally, a muffler may be coupled to a vertical exhaust outlet. However, standard-sized engine cabs combined with the larger treatment systems forced by more stringent emissions requirements require increased catalyst capacity. This constraint of available space with increasing space usage requirements may create packaging issues. For example, a taller engine cab may be required to accommodate the necessary catalyst volume and frontal area of the exhaust aftertreatment system. But, a taller engine cab may not be possible (as a locomotive may not fit through a tunnel at some level of height, for example).

It may be desirable to have systems and methods that differ from those currently available.

BRIEF DESCRIPTION

In one embodiment, an exhaust aftertreatment system includes a support platform and at least one isolated leg coupled to the support platform. The exhaust aftertreatment system further includes one or more catalysts arranged in parallel with one another and supported above the support platform by the plurality of isolated legs. An aftertreatment outlet manifold may be coupled to the plurality of catalysts.

BRIEF DESCRIPTION OF THE DRAWINGS

FIGS. 2-13 are drawn approximately to scale.

DETAILED DESCRIPTION

The following description relates to embodiments of an exhaust aftertreatment system. The aftertreatment system includes a support platform, at least one isolated leg coupled to the support platform, one or more catalysts arranged in parallel with one another and supported above the support platform by the isolated leg, and an aftertreatment outlet manifold coupled above the catalyst. As used herein, the term isolate means to attenuate, reduce, or separate. That is, an isolated component may experience reduced or no vibration when coupled to a vibrating component.

The support platform may be an integrated front end of an engine and the isolated leg supporting the catalyst may be coupled to the integrated front end. The support platform may be, or may be coupled to, a housing of a turbocharger of an engine. The one or more isolated legs supporting the plurality of catalysts may be coupled to the turbocharger housing. In one embodiment, the support platform may include both the integrated front end and the turbocharger housing and the isolated leg may be coupled to the integrated front end and another isolated leg may be coupled to the turbocharger housing. In another embodiment, the support platform may be another type of support surface of an engine.

Figure 1:
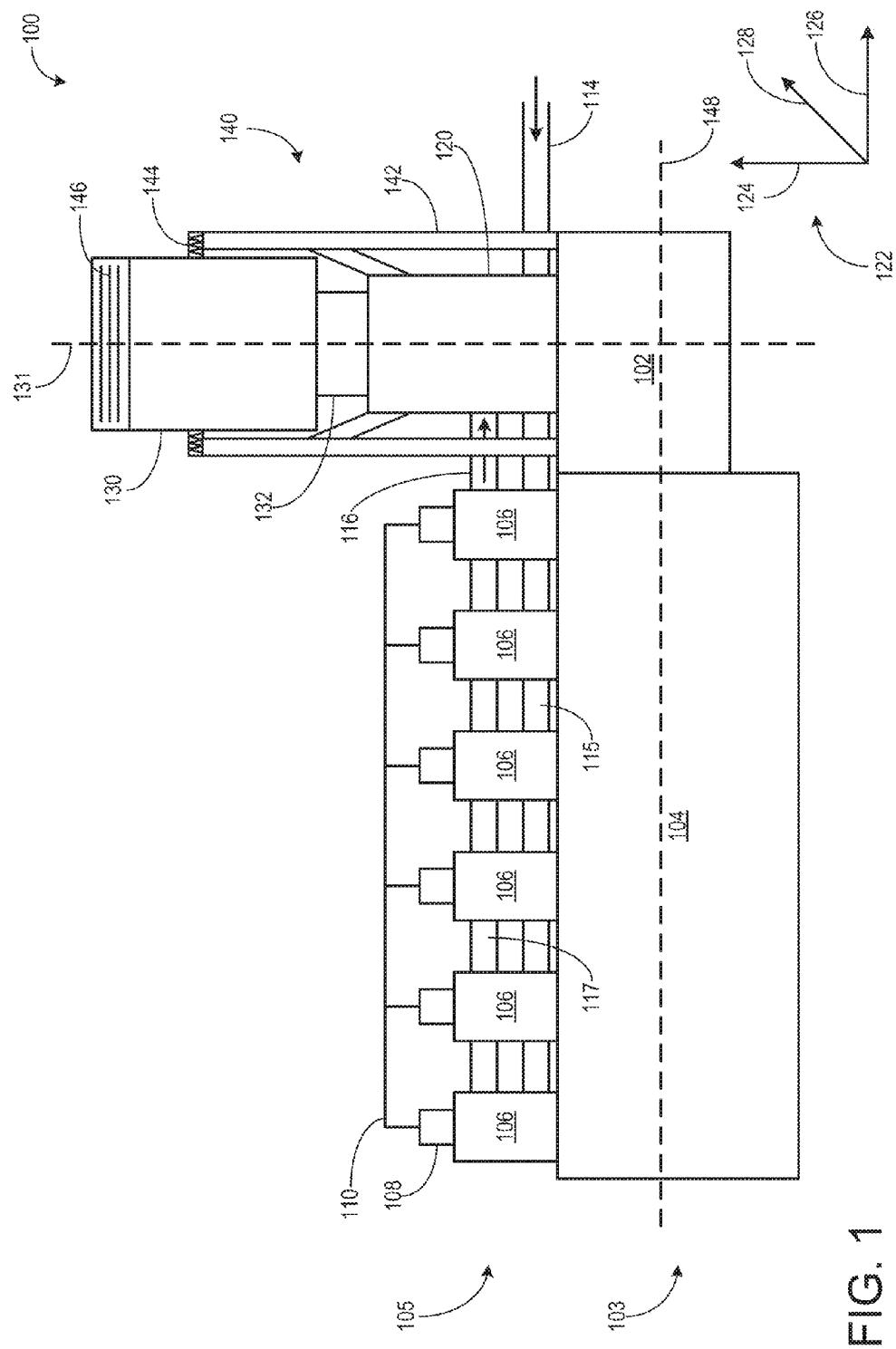
FIG. 1 shows an engine system including an exhaust gas aftertreatment system according to an embodiment of the invention.
Figure 3:
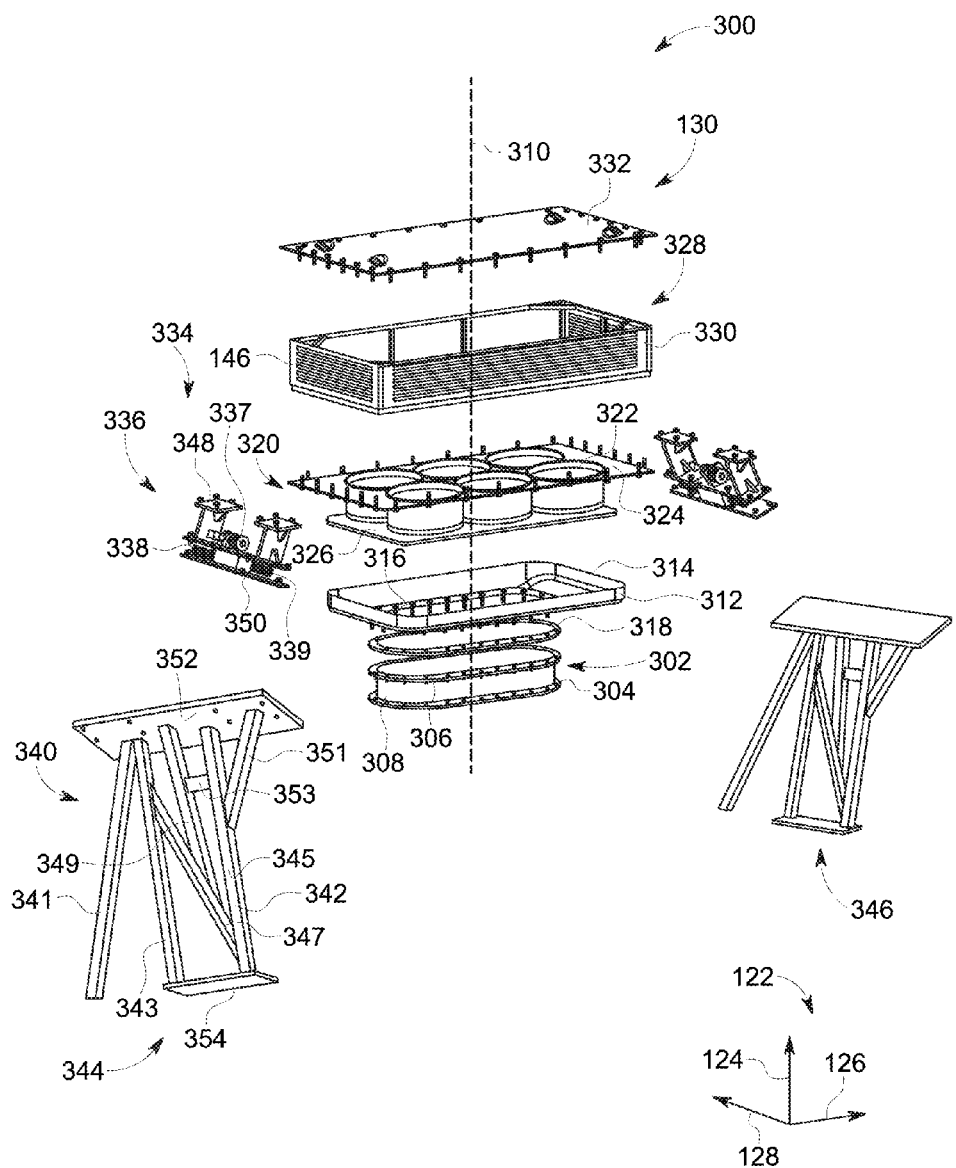
FIG. 3 shows a schematic of disassembled components of an exhaust aftertreatment system and associated support structure according to an embodiment of the invention.
Figure 4:
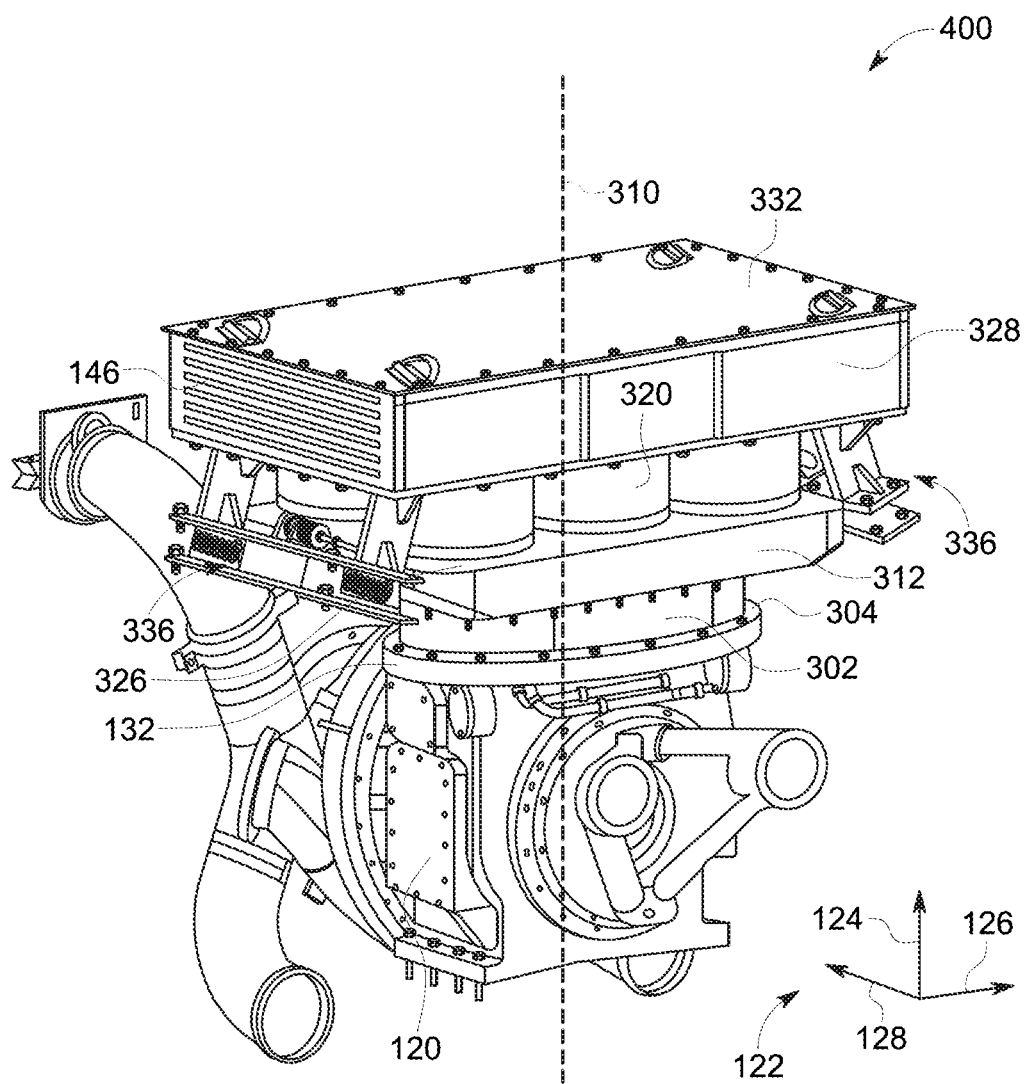
FIG. 4 shows an assembled view of an exhaust aftertreatment system coupled to a vertical exhaust outlet of a turbocharger turbine according to an embodiment of the invention.
Figure 5:
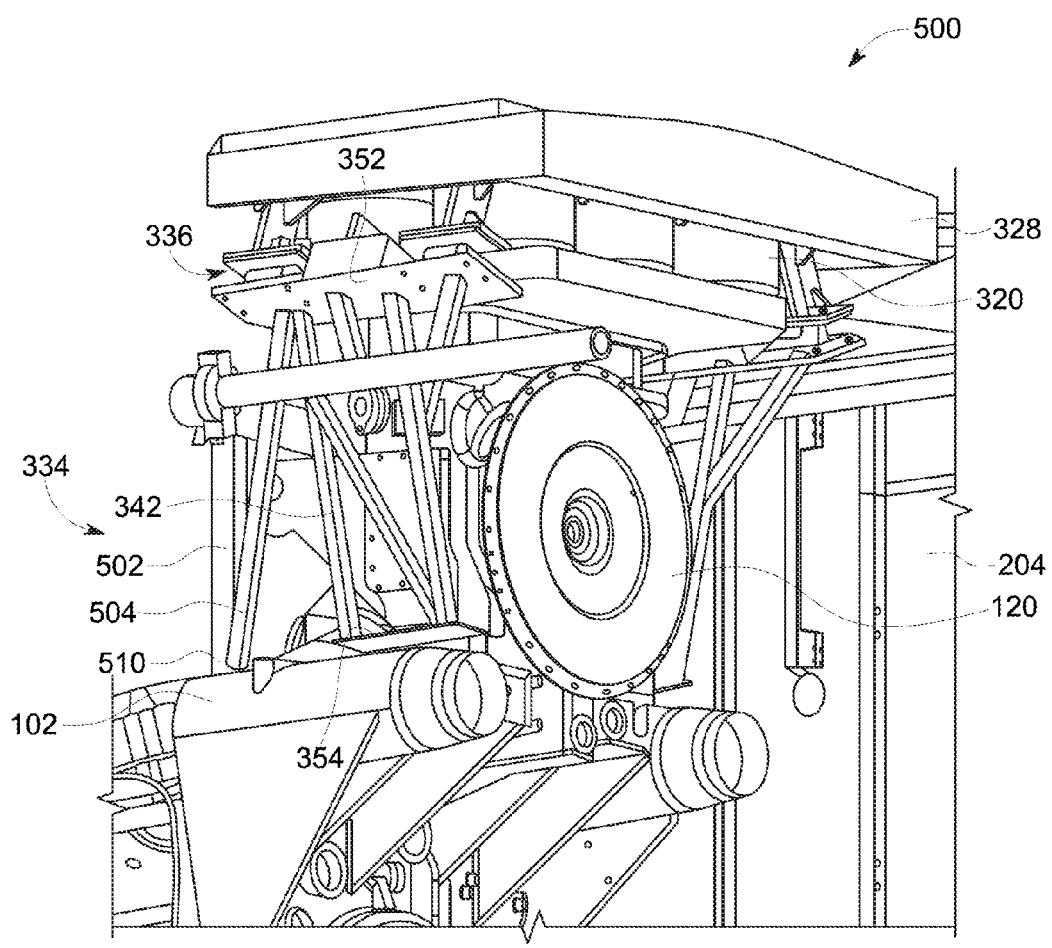
FIGS. 5-6 show a first embodiment of an exhaust aftertreatment system support structure mounted to an integrated front end of an engine according to an embodiment of the invention.
Figure 6:
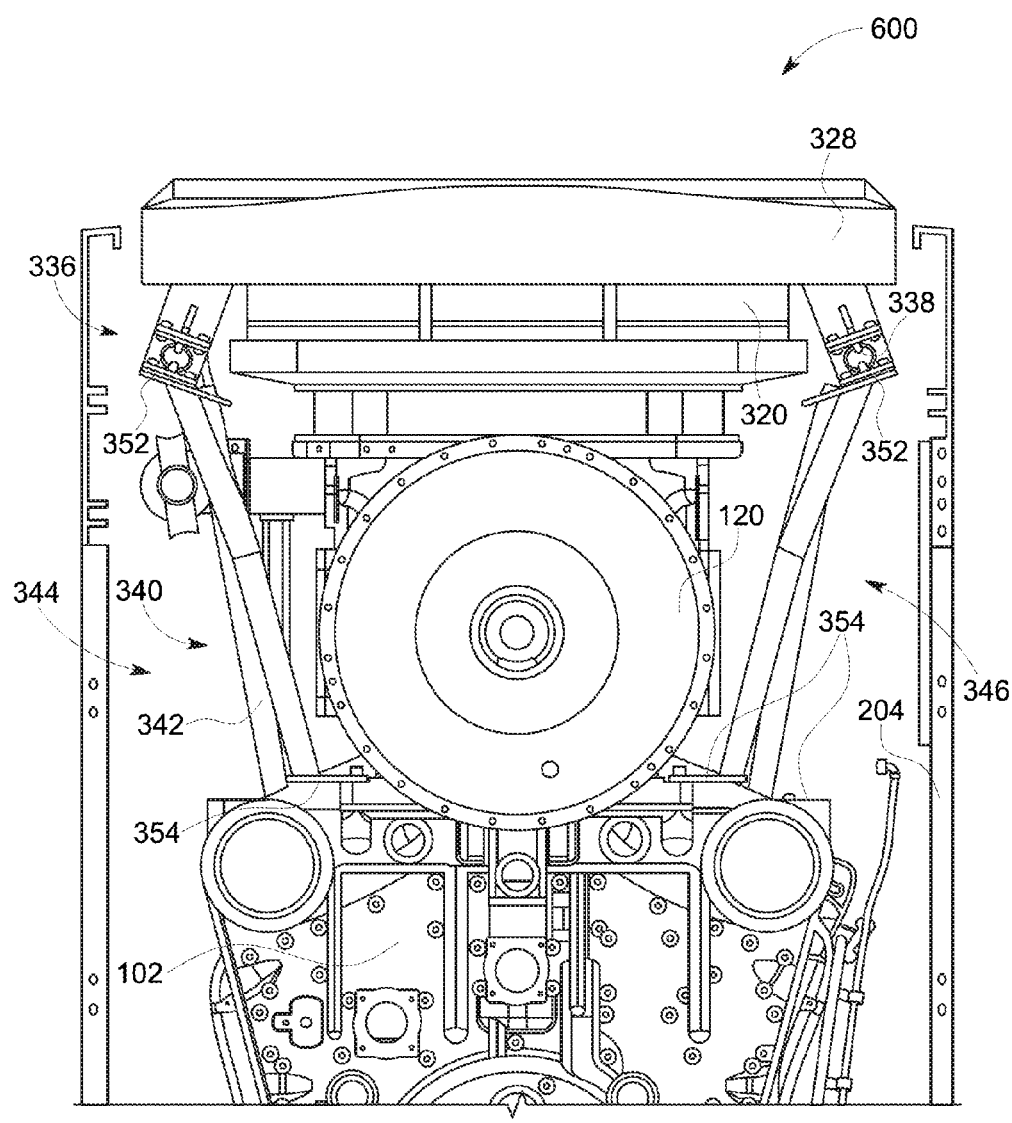
Figure 7:
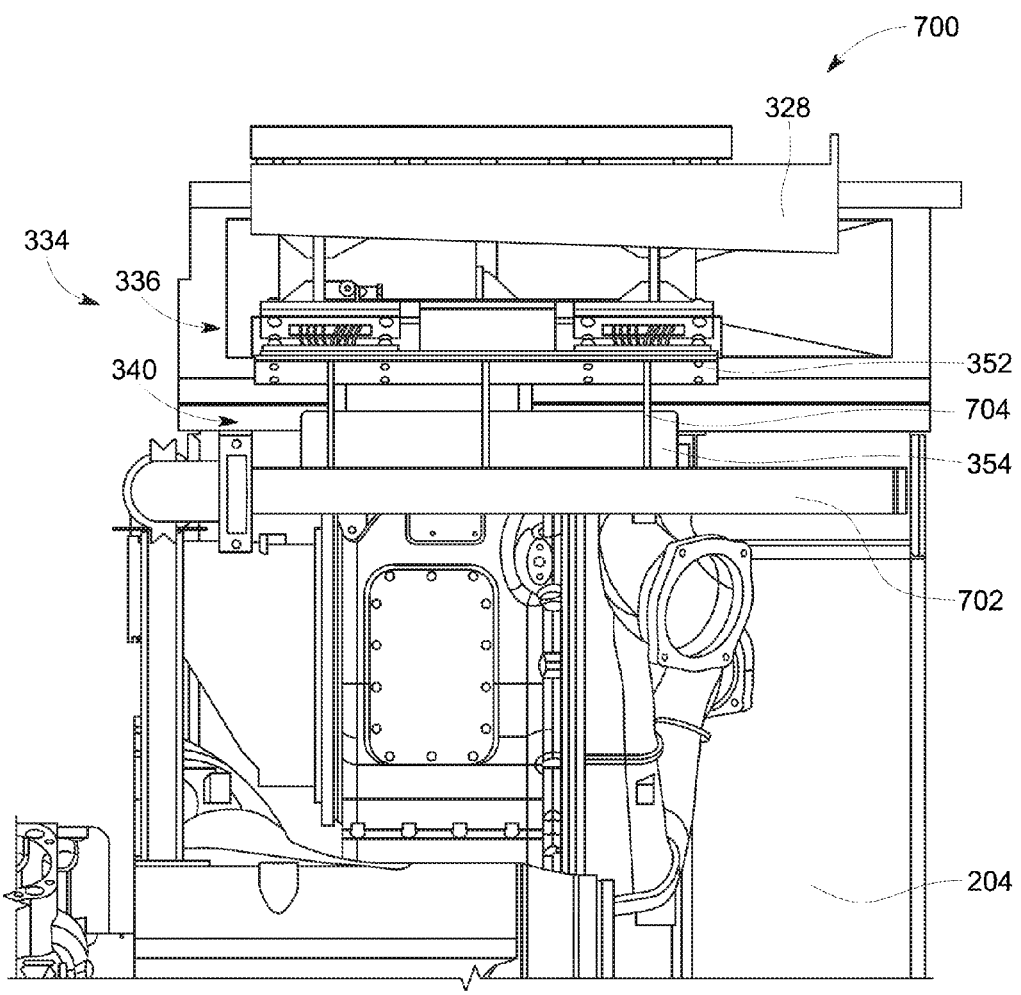
FIGS. 7-8 show a second embodiment of an exhaust aftertreatment system support structure mounted to a housing of a turbocharger according to an embodiment of the invention.
Figure 8:
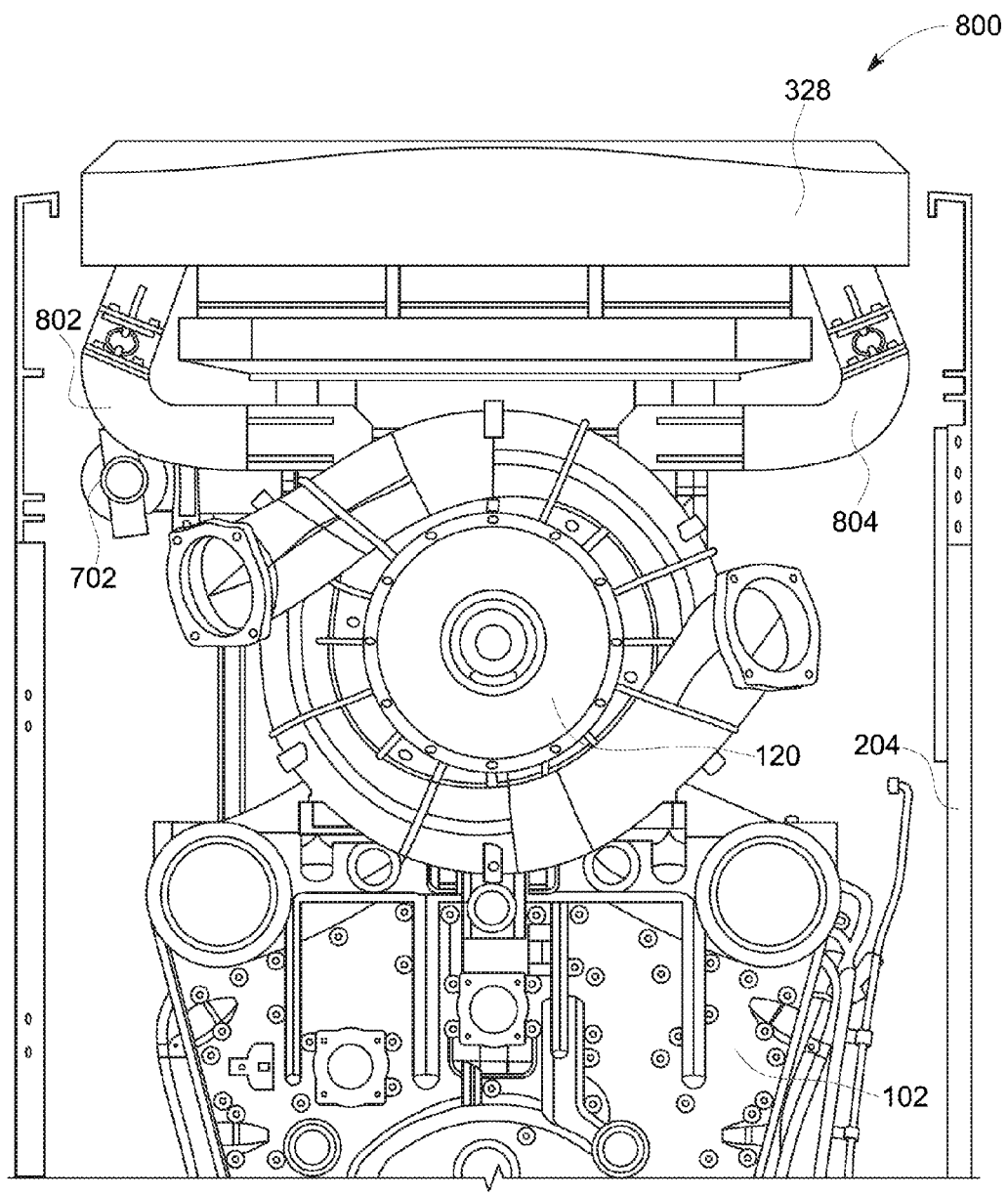

In one embodiment, the exhaust aftertreatment system is mounted to an engine and coupled to a vertical exhaust outlet of a turbocharger, as shown in FIG. 1. As such, the exhaust aftertreatment system may be arranged vertically above the turbocharger. The engine may be positioned within an engine cab, such as the engine cab shown in FIG. 2. The engine cab may include a cut-out shaped to allow an aftertreatment outlet manifold of the exhaust aftertreatment system to pass through the cut-out to an exterior of the engine cab. As a result, treated exhaust gas may be ducted from the exhaust aftertreatment system to an exterior of the engine cab. FIG. 3 shows the components of the exhaust aftertreatment system including a catalyst array, aftertreatment outlet manifold, and support structure including a plurality of isolated legs. As described above, the exhaust aftertreatment system may be coupled to a vertical exhaust outlet of a turbocharger, as shown in FIG. 4. FIGS. 5-6 show a first embodiment of a mounting arrangement of the exhaust aftertreatment system on the turbocharger outlet and the integrated front end of the engine. FIGS. 7-8 show a second embodiment of a mounting arrangement of the exhaust aftertreatment system on the turbocharger outlet and an exterior of a turbocharger housing. FIGS. 9-13 show a third embodiment of a mounting arrangement and support structure for the exhaust aftertreatment system.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV).

Before further discussion of the exhaust aftertreatment system and support structure, an exemplary embodiment of an engine system is disclosed in which the exhaust aftertreatment system and support structure may be installed. For example, FIG. 1 shows an engine system 100 with an engine 104. The engine receives intake air for combustion from an intake passage 114. The intake may be any suitable conduit or conduits through which gases flow to enter the engine. For example, the intake may include an intake manifold 115, the intake passage, and the like. The intake passage receives ambient air from an air filter (not shown) that filters air from outside of the engine. Exhaust gas resulting from combustion in the engine is supplied to an exhaust, such as exhaust passage 116. The exhaust, or exhaust passage, may be any suitable conduit through which gases flow from the engine. For example, the exhaust may include an exhaust manifold 117, the exhaust passage, and the like. Exhaust gas flows through the exhaust passage and out of the engine system. In one example, the engine is a diesel engine that combusts air and diesel fuel through compression ignition. In other non-limiting embodiments, the engine may combust fuel including gasoline, kerosene, biodiesel, or other petroleum distillates through compression ignition (and/or spark ignition). In another non-limiting embodiment, the engine may combust multiple fuels, such as but not limited to, a diesel-natural gas dual fuel engine.

In one embodiment, the engine is a Vee engine (e.g., V-engine) having a first bank of cylinders and a second bank of cylinders. In the embodiment depicted in FIG. 1, the engine is a V-12 engine having twelve cylinders. In other examples, the engine may be a V-6, V-8, V-10, or V-16 or any suitable V-engine configuration. In another embodiment, he engine is an in-line engine including a plurality of cylinders. The engine includes an engine block 103 and an engine head 105 coupled to and above the engine block. The engine head includes a plurality of cylinder heads, each cylinder head 106 including a respective cylinder. Specifically, FIG. 1 shows six individual cylinder heads for a first bank of the engine. The other six individual cylinder heads of the second bank are hidden in FIG. 1, as they may be positioned behind the six cylinder heads of the first bank.

Each cylinder head may include a valve cover 108. Additionally, each cylinder head may include a fuel injector. Each fuel injector passes through a respective valve cover and connects to a high pressure fuel line 110. The high pressure fuel line runs along a length of the engine. Each cylinder head is further coupled to the exhaust manifold. As such, exhaust gases produced during combustion exit the cylinder heads through the exhaust manifold and then flow to the exhaust passage. The exhaust passage contains additional engine system components, including a turbine of a turbocharger 120 and an exhaust gas aftertreatment system 130, described further below. The turbine of the turbocharger routes exhaust gases directly from the engine exhaust passages, downstream of the engine cylinders, to the exhaust gas aftertreatment system. As such, the turbocharger turbine is physically and fluidically coupled directly between the engine exhaust passage and the aftertreatment system.

The turbocharger is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. As shown in FIG. 1, the turbocharger is coupled to the engine and mounted on an integrated front end 102 (e.g., shelf) of the engine. The integrated front end (IFE) provides various mounting bosses for support structures supporting various components of the engine, including the turbocharger and the exhaust gas aftertreatment system, as described further below.

FIG. 1 shows a coordinate axis 122 including a vertical axis 124, a horizontal axis 126, and a lateral axis 128. The turbocharger has a vertical exhaust outlet 132, the vertical exhaust outlet positioned vertically with respect to a longitudinal axis 148 of the engine. The longitudinal axis of the engine is aligned with the horizontal direction and the vertical exhaust outlet is aligned with the vertical axis. As such, a flow direction of exhaust through the vertical exhaust outlet is perpendicular to a flow direction of exhaust through the exhaust passage upstream of the turbocharger (e.g., exhaust passage 116).

The exhaust gas aftertreatment treatment system 130 is coupled in the exhaust passage in order to reduce regulated emissions. As depicted in FIG. 1, the aftertreatment system is disposed downstream of the turbocharger. The exhaust gas aftertreatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, a catalytic hydrocarbon converter, and/or various other emission control devices or combinations thereof. Thus, one or more of the emission control devices of the exhaust gas treatment system may convert carbon monoxide and/or hydrocarbons in the exhaust gases from the engine to carbon dioxide before expelling exhaust gases to the environment. The exhaust gas treatment system may include a combination of emission control devices that convert hydrocarbons (hydrocarbon converting devices) and/or a particulate filter for removing particulate matter (such as soot) from exhaust gases.

Further, as shown in FIG. 1, the aftertreatment system is positioned vertically above the turbocharger, with respect to a surface on which the engine sits. Specifically, the aftertreatment system is directly coupled to the vertical exhaust outlet of the turbocharger. As such, exhaust exiting the turbocharger flows in the vertical direction, with respect to the vertical axis, from the vertical exhaust outlet and into the exhaust aftertreatment system. Further, a longitudinal axis 131 of the aftertreatment system is perpendicular to the longitudinal axis of the engine. The longitudinal axis of the aftertreatment system intersects the turbocharger such that the aftertreatments system is positioned directly vertically over the turbocharger. Further still, a direction of exhaust gas flow through the vertical exhaust outlet of the turbocharger and the entire aftertreatment system is perpendicular to a direction of exhaust gas flow through the exhaust passage 116

As shown in FIG. 1, the entirety of the aftertreatment system, including one or more catalysts and/or alternate emission control devices, is positioned forward of all cylinder heads and all cylinder valve covers of the engine, relative to the integrated front end of the engine. Thus, the aftertreatment system is not positioned vertically above any of the cylinder heads. Instead, the aftertreatment system is offset from all the cylinder heads such that an area above the cylinder heads is not covered by any part of the exhaust aftertreatment system. The aftertreatment system is positioned above and over only a portion of the engine which includes the integrated front end and the aftertreatment system is not arranged over an entire length of the engine block. Further, the aftertreatment system is stacked vertically above the vertical exhaust outlet of the turbocharger and extends above the turbocharger outlet in a direction perpendicular to the longitudinal axis of the engine from an inlet of the aftertreatment system to an outlet of the aftertreatment system (aftertreatment outlet manifold), as depicted at the vents 146 in FIG. 1. In this way, exhaust flowing through the aftertreatment system flows vertically from an inlet to an outlet of the aftertreatment system (perpendicular to a direction of flow through exhaust passages of the engine, upstream of the turbocharger), where the outlet is where the exhaust gases exit the aftertreatment system and enter an outside environment. In some embodiments, the aftertreatment outlet, or outlet manifold, may be referred to as an exhaust stack of the engine. Thus, the exhaust stack of the engine is arranged parallel to the vertical exhaust outlet of the turbocharger and along the longitudinal axis of the aftertreatment system. As discussed further below, the aftertreatment system is mounted on a single side of the engine (e.g., the side including the integrated front end) and does not span across a length of the engine, where the length is defined parallel to the longitudinal axis of the engine.

The aftertreatment system is supported by a support structure 140. The support structure may include one or more support legs 142 (e.g., support members) and vibration isolators 144. Each of the support legs may be directly mounted to either the integrated front end of the engine and/or a housing of the turbocharger. In one example, each of the support legs may be directly mounted to only the integrated front end of the engine. In another example, each of the support legs may be directly mounted to only the turbocharger housing. As described further below, the vibration isolators may isolate the aftertreatment system from vibration generated and transmitted by the engine. Further details of the components of the aftertreatment system and its support structure are described below with regard to FIGS. 3-8.

Figure 2:
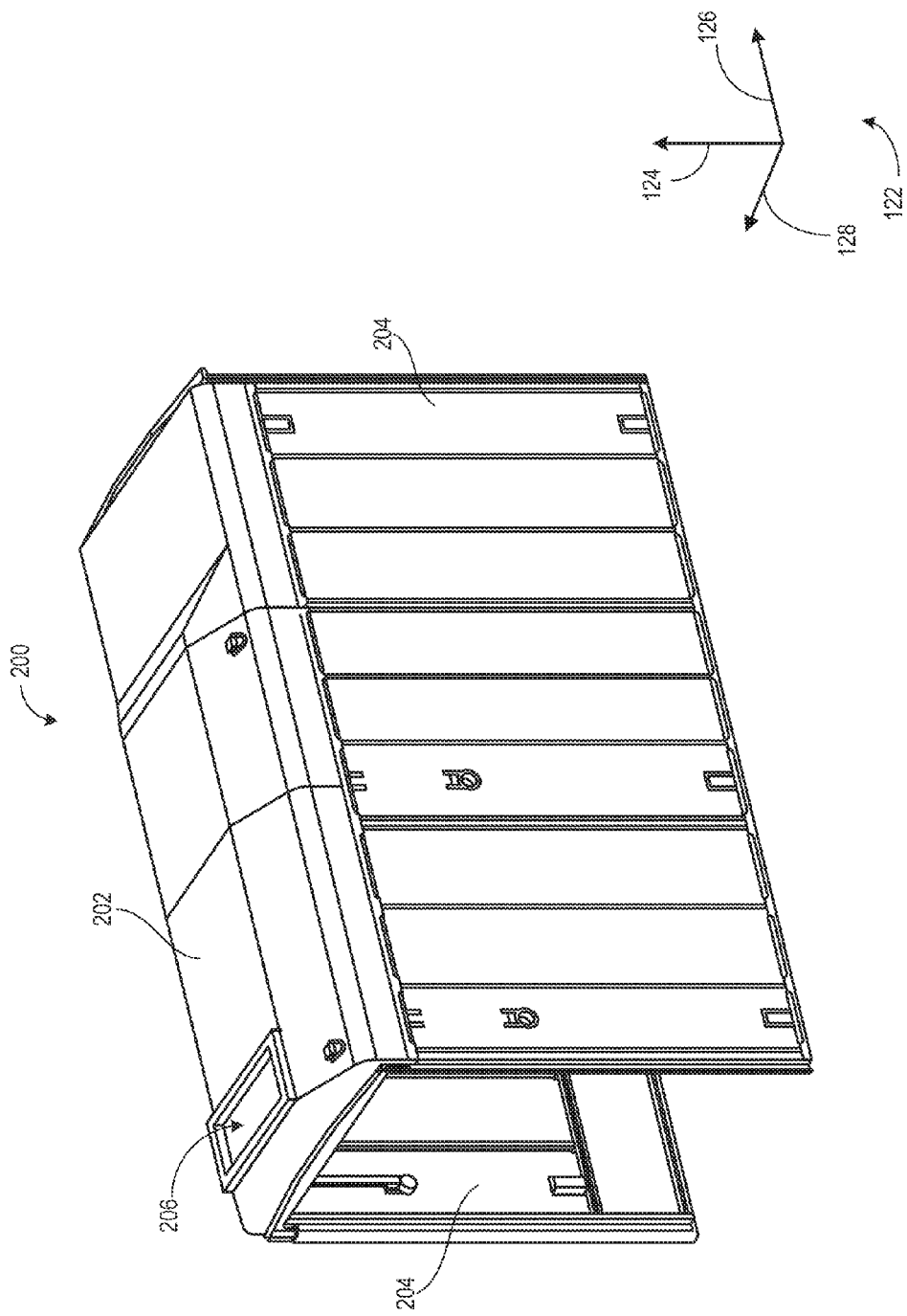
FIG. 2 shows an engine cab according to an embodiment of the invention.

In one embodiment, the engine system may include an engine cab, as shown in FIG. 2. In this embodiment, the exhaust gas aftertreatment system is positioned vertically above and on top of the turbocharger outlet such that it fits within a space defined by a top surface of the turbocharger, a roof assembly 202 of an engine cab 200, and the cab sidewalls 204 of the engine cab. The engine may be positioned in the engine cab such that the longitudinal axis of the engine is aligned in parallel with a length of the cab. As depicted in FIG. 1, a longitudinal axis of the exhaust gas treatment system is aligned perpendicular to the longitudinal axis of the engine.

The roof assembly of the engine cab may include a cut-out 206 for a portion of the exhaust aftertreatment system to pass through. The cut-out is shaped to fit a portion of the exhaust aftertreatment system. As shown in FIG. 2, the cut-out in the engine cab is rectangular. The portion of the exhaust aftertreatment system may include an aftertreatment outlet manifold including one or more vents 146 (as shown in FIG. 1). As shown in FIGS. 3-4, discussed further below, the aftertreatment outlet manifold may be rectangular and direct exhaust passing through the aftertreatment out through the vents. In alternate embodiments, the aftertreatment outlet manifold may have a different shape (e.g., square or oblong) and the cut-out in the engine cab may have a complementary shape. At least a portion of the aftertreatment outlet manifold is positioned outside of and vertically above a top surface of the roof assembly of the engine cab. Specifically, the aftertreatment outlet manifold may pass through the cut-out of the roof assembly such that the vents stick out of the cut-out and duct treated exhaust outside the engine cab and not back into the engine cab area.

In an alternate embodiment, the exhaust aftertreatment system may be directly coupled to the cab. For example, a portion of the exhaust aftertreatment system may be coupled to the roof and/or cab sidewalls of the cab.

In one embodiment, the exhaust aftertreatment system of FIG. 1 and as described below with regard to FIGS. 3-8 is a replacement for a standard horizontally-arranged aftertreatment system that is positioned horizontally along a length of the engine. The aftertreatment system may also be a replacement for a standard muffler mounted to the vertical exhaust outlet of the turbocharger. As introduced above, smaller engine cabs and/or more stringent emissions requirements may not allow for a horizontally arranged exhaust aftertreatment system oriented above cylinder heads of the engine and along a length of the engine. For example, the required aftertreatment devices and catalysts to meet emissions targets may not fit within a space defined between a top of the engine and a top of the engine cab without increasing a size of the engine cab. However, changing the size of the engine cab may be costly. Thus, the vertically-oriented aftertreatment system described below may include all the required catalysts and aftertreatment devices without requiring a larger space or larger engine cab. In this way, the aftertreatment system shown in FIG. 1 and FIGS. 3-8 may provide noise reduction and emissions reduction, while also fitting within a space defined by the engine, the turbocharger having the vertical exhaust outlet, and a top of a traditional engine cab.

FIGS. 3-13 show an aftertreatment system and support structure for an engine, such as the aftertreatment system 130 and support structure 140 shown in FIG. 1. In one embodiment, components of the aftertreatment system and associated support structure may be included in a replacement kit for an existing exhaust aftertreatment system and muffler or a retrofit kit for a system that did not previously include an aftertreatment system. For instances where a retrofit kit adds aftertreatment capabilities to a system otherwise not having such a system, packaging constraints may exist that need to be accounted for. For systems in which an aftertreatment system exists, there may be constraints such that the replacement system must fit in the same envelop as the older system. In another embodiment, the aftertreatment system and support structure may be already installed in an engine system having a turbocharger with a vertical exhaust outlet and an engine cab surrounding the engine. Components introduced above with reference to FIG. 1 may be similarly labeled in FIGS. 3-13. More specifically, FIG. 3 shows a schematic of the disassembled components of the aftertreatment system and associated support structure. FIG. 4 shows an assembled view of the aftertreatment system coupled to a vertical exhaust outlet of a turbocharger turbine. FIGS. 5-6 show a first embodiment of the aftertreatment system support structure mounted to an integrated front end of the engine. FIGS. 7-8 show a second embodiment of the aftertreatment system support structure mounted to a housing of the turbocharger. FIGS. 9-13 shows a third embodiment of the aftertreatment support structure.

As described in FIGS. 3-13 below, the bottom and top of the exhaust aftertreatment system and the bottom and top of the components of the exhaust aftertreatment system are relative to a longitudinal axis 310 (similar to longitudinal axis 131 shown in FIG. 1) of the assembled exhaust aftertreatment system. For example, a bottom of the exhaust aftertreatment system may be proximate to a turbocharger outlet while a top of the exhaust aftertreatment system is proximate to an engine cab when the exhaust aftertreatment system is assembled within an engine. In this way, the exhaust aftertreatment system may be vertically oriented with respect to its longitudinal axis and with respect to the vertical direction.

Turning first to FIG. 3, schematic 300 shows each component of the exhaust aftertreatment system 130 and support structure. As described above, each of the components shown in FIG. 3 may be included in a replacement or retrofit exhaust aftertreatment system and muffler kit. The exhaust aftertreatment system may include a flexible duct 302. The flexible duct may include a flexible sidewall 308 comprising a flexible material. As shown in FIG. 3, the flexible duct is oval-shaped with the flexible sidewall being continuous without corners. In other embodiments, the flexible duct may be another shape (e.g., rectangular). The flexible duct may be coupled to an exhaust outlet of a turbine of a turbocharger. As such, the flexible duct may be shaped complementary to a shape of a turbocharger exhaust outlet. Further, the bottom of the flexible duct (e.g., the entrance to the flexible duct) may be referred to herein as the inlet to the exhaust aftertreatment system. The inlet of the exhaust aftertreatment may be directly coupled to the exhaust outlet of the turbocharger turbine, as shown in FIG. 4, described further below. Further, the inlet may be centered along the longitudinal axis of the exhaust aftertreatment system.

The flexible sidewall is positioned between a first mounting flange 304 and a second mounting flange 306 of the flexible duct. The first mounting flange is positioned around a bottom perimeter of the flexible duct and the second mounting flange is positioned around a top perimeter of the flexible duct. The first mounting flange may be coupled to a muffler mounting platform of an outlet of a turbocharger. The muffler mounting platform may be an existing mounting platform of the turbocharger exhaust outlet that may couple to a muffler component. More specifically, the first mounting flange may include one or more mounting apertures around the perimeter of the flange that mate with corresponding apertures on a mounting platform of the vertical exhaust outlet of the turbocharger turbine.

The exhaust aftertreatment system further includes a transition piece 312. The transition piece may include a top mounting surface 314 around an upper perimeter of the transition piece and an interior mounting flange 316 at a bottom of the transition piece. The interior mounting flange defines an oval-shaped opening in a bottom of the transition piece. The oval-shaped opening corresponds in size to the oval-shaped opening of the flexible duct. The interior mounting flange may define one or more mounting apertures and fasteners positioned within the mounting apertures. As such, the interior mounting flange of the transition piece may be coupled to the second mounting flange of the flexible duct. As shown in FIG. 3, the exhaust aftertreatment system may include an oblong gasket 318 adapted to be positioned between the second mounting flange of the flexible duct and the interior mounting flange of the transition piece. In alternate embodiments, the kit or the exhaust aftertreatment system may not include the oblong gasket. In yet other embodiments, the flexible duct, gasket, and interior mounting flange may other than oval-shaped (e.g., such as square or rectangular), where the shape of the components corresponding to a shape of the exhaust outlet of the turbocharger such that exhaust is directed from the turbocharger outlet and through the flexible duct and transition piece when the exhaust aftertreatment system is assembled and coupled to the turbocharger. Further, flanges and/or lips may be present to facilitate sealing.

The transition piece expands outwardly from the interior mounting flange and to the top mounting surface such that a perimeter of the top mounting surface is larger than a perimeter of the interior mounting flange. In one embodiment, the transition piece may include vertical sidewalls proximate to the top mounting surface.

The exhaust aftertreatment system further includes a catalyst array 320 including one or more catalysts 322. The catalyst array may include a top mounting plate 324 and a bottom mounting plate 326. The top mounting surface of the transition piece may be coupled to the bottom mounting plate of the catalyst array. In one embodiment, two or more of the catalysts may be positioned to be parallel with one another and disposed between the top mounting plate and the bottom mounting plate. Further, the one or more of the catalysts may be spaced away from outer edges of the top mounting plate and the bottom mounting plate. Each catalyst may have a catalyst inlet positioned in the bottom mounting plate and a catalyst outlet positioned in the top mounting plate. The inlet and outlet of each catalyst are parallel and in-line with each other and the inlet and outlet of each catalyst are parallel with inlets and outlets of the other catalysts in the catalyst array. As such, each catalyst may be vertically aligned within the catalyst array with longitudinal axes of the catalysts arranged in parallel with one another and arranged in parallel with the longitudinal axis of the exhaust aftertreatment system, where the longitudinal axes of the catalysts are defined in a direction of gas flow through the catalysts, from the inlet to outlet of the catalyst array and each catalyst within the array. Further, the catalyst inlet and catalyst outlet of a single catalyst in the catalyst array are not offset from each other, but arranged vertically in-line such that each catalyst has a vertical axis that is parallel to the longitudinal axis of the exhaust aftertreatment system.

As shown in FIG. 3, the catalysts may be arranged in catalyst canisters. The catalysts (and catalyst canisters) may be arranged in rows within the catalyst array. For example, as shown in FIG. 3, the catalyst array may include six catalyst canisters arranged in two rows of three catalysts. In other embodiments, the six catalyst canisters may be in another type of arrangement such as three rows of two catalysts or one row of six catalysts. In yet other embodiments, the catalyst array may include more or less than six catalysts (e.g., 5 or 8 catalysts). For catalyst stacks that may be prone to clogging or fouling, a regeneration device (not shown) may be provided, such as a heater or a fuel injector. For example, a regeneration device may be positioned vertically below and coupled to the catalyst array.

The plural "catalysts" may refer to differing types of catalytic materials that perform the same function (e.g., diesel oxidation), or to differing concentrations of the same catalytic materials disposed in different locations relative to each other (e.g., higher concentrations in relatively cooler locations to achieve a more uniform conversion), or to differing types of catalytic materials that perform differing functions (e.g., a diesel oxidation material and a carbon monoxide conversion material). In one embodiment, the catalysts are oxidation catalysts and the canisters containing the catalysts are oxidation catalyst canisters. In another embodiment, the catalyst array may include different types of aftertreatment devices or catalysts such as selective catalytic reduction (SCR) catalysts. In some embodiments, one or more of the canisters of the catalyst array may include a particulate filter (such as a diesel particulate filter). In this embodiment, at least one catalyst and at least one particulate filter may be arranged in parallel with one another within the catalyst array and exhaust may flow in parallel through the catalyst and particulate filter. In another embodiment, one or more particulate filters may be positioned vertically above or below the catalyst array within the aftertreatment system. For example, one or more particulate filters may be positioned vertically above and coupled directly to the catalyst array such that exhaust gases flow in parallel and vertically in-line through the catalysts and particulate filters.

The exhaust aftertreatment system may include an aftertreatment outlet manifold 328 arranged vertically above the catalyst array 320 such that a direction of exhaust flow entering the aftertreatment outlet manifold is parallel to a direction of exhaust flow flowing through the catalyst array. Suitable manifolds may protect the catalysts from environmental conditions (such as dirt, sand, rain and snow). The aftertreatment outlet manifold may include a cover 332 and vents 146 positioned in sidewalls 330 of the aftertreatment outlet manifold. The sidewalls may be referred to herein as vertical sidewalls. As shown in FIG. 3, the aftertreatment outlet manifold is rectangular with four sidewalls. In one embodiment, as shown in FIG. 3, only three of the four sidewalls include the vents. In another embodiment, all of the sidewalls may include vents. In yet another embodiment, only one or two sidewalls may include vents while the other sidewalls may be solid and continuous, thus being without vents. Instances having vents align the vents horizontally along a length of the sidewalls. The vents in each sidewall are arranged in parallel, horizontally above and below one another, along a height of each sidewall. As such, the vents may be stacked along a height of each sidewall. Each vent is defined by a rectangular aperture through a sidewall of the aftertreatment outlet manifold. Each vent has a longer length than width of the vent. As shown in FIG. 3, the vents extend from one end of a sidewall to another end of a sidewall, but may be spaced away from the edges of the ends of the sidewalls. In another embodiment, the vents may have varying lengths and extend along a middle portion of a sidewall.

A bottom of the aftertreatment outlet manifold may include a plurality of mounting apertures adapted to be coupled to the top mounting plate of the catalyst array. More specifically, a bottom surface of the sidewalls include the plurality of mounting apertures positioned around an outer perimeter of the aftertreatment outlet manifold. Additionally, the cover may be removably coupled to a top surface of sidewalls of the aftertreatment outlet manifold. In the kit, the cover may either come separate from or already coupled to the aftertreatment outlet manifold. The cover is rectangular and may include a plurality of mounting apertures around an outer perimeter of the cover. The cover is solid such that little to no air and no water may pass through the cover. A length, width, and outer perimeter of the cover may be substantially the same as the length, width, and outer perimeter of the aftertreatment outlet manifold, which is substantially the same as the length, width, and outer perimeter of the top mounting flange of the catalyst array. However, as shown in FIG. 3, the outer perimeter of the top mounting plate is larger than the outer perimeter of the bottom mounting plate. In another embodiment, the outer perimeter of the top and bottom mounting plates may be substantially the same.

In this way, the aftertreatment outlet manifold may be coupled directly above the catalyst array and the catalyst array may be coupled directly about the inlet to the exhaust aftertreatment system (e.g., the flexible duct). As such, the inlet, catalyst array, and outlet manifold are all centered and arranged along the longitudinal axis of the aftertreatment system. Thus, the aftertreatment system has a vertically stacked arrangement where all of its components are stacked on top of one another a share a common central longitudinal axis.

The kit and the exhaust aftertreatment system also include a corresponding support structure. The support structure may be coupled to, or may include, one or more isolated legs 334. Each isolated legs may include a vibration isolator portion 336 including one or more vibration isolators 338 and a support member portion 340 including one or more support legs 342 (e.g., support members). The exploded view of FIG. 3 shows the support member portion disconnected from the isolator portion. In one embodiment, an exhaust aftertreatment kit may include the support member portion separate from the isolator portion with the support member portion and isolator portion adapted to be coupled to one another. In another embodiment, the exhaust aftertreatment kit may include isolated legs with the support member portion already coupled to the corresponding isolator portion.

Each vibration isolator may include a dampening spring, or other resilient element, positioned between two coupling platforms in order to reduce vibrations transferred between the support legs and the aftertreatment system. The one or more vibration isolators may include a wire-rope isolator 339 and/or a spring isolator 337. The wire-rope isolators include a coiled wire-rope element positioned between two coupling platforms, the wire-rope isolators constraining motion in the vertical direction and the lateral (e.g., side-to-side) direction. As shown in FIG. 3 and FIG. 4, the vibration isolator portion is angled with respect to the vertical direction and longitudinal axis of the aftertreatment system. More specifically, the coupling platforms of the wire-rope isolators are angled (e.g., at an angle of 45 degrees) outwardly and away from the longitudinal axis of the aftertreatment system. The angling may provide for vibration isolation in both the vertical and lateral directions. Additionally, the spring isolators include a horizontal stabilizer spring limiting movement in the horizontal direction. In this way, the vibration isolator portion including the one or more vibration isolators dampens movement and vibrations in three directions (e.g., three degrees of freedom).

The support structure may include a first isolated leg 344 and a second isolated leg 346. As such, the support structure may include two isolated legs. In an alternate embodiment, the support structure may include more than two isolated legs, the more than two isolated legs coupling to different sides of the exhaust aftertreatment system.

As shown in FIG. 3, each vibration isolator portion may include a catalyst array mounting platform 348 adapted to be coupled to the top mounting plate of the catalyst array and a support leg mounting platform 350 adapted to be coupled to a first mounting platform 352 of the support legs, referred to herein as an isolator mounting platform. As shown in FIG. 3, the catalyst array mounting platform includes two square platforms separated from one another on opposite sides of the vibration isolator portion. In alternate embodiments, the catalyst array mounting platform may be an alternate shape (e.g., rectangular) and may only include one platform extending over the entire length or only a portion of the length of the vibration isolator portion.

Each support leg is coupled at a first end to the first mounting platform and at a second end to a second mounting platform, referred to herein as a support mounting platform 354, the support mounting platform adapted to be coupled to a support platform, as described in further detail below with reference to FIGS. 5-8. In one example, each support leg may have a square or rectangular cross-section. In another example, each support leg may have a different cross-sectional shape such as circular or triangular. Further, as shown in FIG. 3, each support leg may have a substantially similar thickness. In alternate embodiments, each support leg, or at least one support leg, may have a different thickness than the other support legs.

As shown in FIG. 4, the support legs of the same isolated leg may have different lengths, orientations, angles, and coupling points. For example, a first support leg 341 may extend from the isolator mounting platform to a bottom of the isolated leg. However, the first support leg may not couple to a support mounting platform. Instead, the first support leg may couple directly to the support platform (e.g., directly to the support platform or a mounting plate or boss coupled to the support platform). A second support leg 343 and third support leg 345 may extend directly from the isolator mounting platform to the support mounting platform. Further, a coupling point of the second support leg on the isolator mounting platform may be adjacent to and closer to a coupling point of the first support leg than a coupling point of the third support leg to the isolator mounting platform. A fourth support leg 347 may extend between a point on the second support leg and an end of the third support leg. As such, the fourth support leg is angled between the second support leg and the third support leg, thereby providing cross-stability to the support structure. A fifth support leg 349 may extend between the isolator mounting platform and a point mid-way on the fourth support leg. A sixth support leg 351 may extend between the isolator mounting platform and the third support leg. Finally, a seventh support leg 353 may extend cross-wise between the third support leg and the fifth support leg, the seventh support leg shorter than the other support legs. In this way, the interconnected system of support legs extending in different directions may provide increased support and stability to the isolated leg and exhaust aftertreatment system.

Turning to FIG. 4, a schematic 400 shows the exhaust aftertreatment components of FIG. 3 assembled and coupled to the exhaust outlet of a turbocharger turbine. The components of the exhaust aftertreatment system may be stacked vertically with respect to the longitudinal axis of the exhaust aftertreatment system and the vertical direction. As shown in FIG. 4, the flexible duct 302 (e.g., inlet to the exhaust aftertreatment system) is coupled to the vertical exhaust outlet 132 of the turbocharger. Specifically, the first mounting flange (e.g., bottom mounting flange) 304 of the flexible duct is directly coupled to the vertical exhaust outlet of the turbocharger turbine. The transition piece 312 is coupled above the flexible duct such that both the transition piece and the flexible duct are centered along the longitudinal axis 310 and are coupled directly above/below one another such that they are in a stacked arrangement (e.g., vertically stacked). In one embodiment, the bottom of the transition piece (at the interior mounting flange) is coupled directly to the second mounting flange (e.g., top mounting flange, top mounting flange not shown in FIG. 4) of the flexible duct without any additional components between the transition piece and flexible duct. In another embodiment, a gasket (not shown in FIG. 4) is positioned between the flexible duct and transition piece. As described above, the flexible duct is oval-shaped and the transition piece may include an oval-shaped opening mating with the first mounting flange at a top surface of the oval-shaped flexible duct.

The catalyst array 320 is coupled and stacked vertically above the flexible duct through the transition piece. The top mounting surface of the transition piece couples directly to the bottom mounting plate 326 of the catalyst array, without any additional components between the transition piece and the catalyst array. The top mounting plate of the catalyst array (not shown in FIG. 4) is coupled to the aftertreatment outlet manifold 328. More specifically, a bottom surface of the aftertreatment outlet manifold is directly coupled to the top face of the top plate of the catalyst array, along an outer perimeter of the top plate, without any additional components positioned between the aftertreatment outlet manifold and the catalyst array. The cover 332 is directly coupled to a top surface of the aftertreatment outlet manifold and fully covers the opening defined by the outer perimeter of the exhaust aftertreatment manifold. Thus, as explained above, the flexible duct, transition piece, catalyst array, and aftertreatment outlet manifold are each centered along the longitudinal axis of the aftertreatment system and are coupled directly above/below one another such that they are in a stacked arrangement (e.g., vertically stacked). Further, as shown in FIG. 4, the vertical exhaust outlet of the turbocharger is also centered along the longitudinal axis of the aftertreatment and the entire exhaust aftertreatment system is stacked vertically above the turbocharger and offset from a remainder of the engine positioned away from the turbocharger.

As described above, the catalysts of the catalyst array may be vertically aligned with respect to the longitudinal axis of the exhaust aftertreatment system and a flow direction through the exhaust aftertreatment system. Exhaust air flows from an exhaust source, in this case the vertical exhaust outlet of the turbocharger, through the flexible duct, then through the transition piece which directs airflow into the plurality of catalysts of the catalyst array, in a direction parallel to the longitudinal axis. Air flows through the length of each catalyst (from an inlet to an outlet of each catalyst) and then into the aftertreatment outlet manifold in the direction parallel to the longitudinal axis. The treated exhaust air then flows out the sides of the aftertreatment outlet manifold through the vents positioned in the sidewalls of the aftertreatment outlet manifold. Thus, treated exhaust air flows through the vents in the sidewalls and not through a top of the aftertreatment outlet manifold. In an alternate embodiment, a portion of the treated exhaust may flow through the top of the aftertreatment outlet manifold.

The isolated legs couple to the bottom mounting plate of the catalyst array. A first end of each vibration isolator portion 336 is directly coupled to a bottom face of the top mounting plate of the catalyst array and a second end of each vibration isolator portion is coupled to the support member portion, the support member portion including one or more support legs, as shown in FIG. 3 and FIGS. 5-8 (the support legs have been removed from FIG. 4 for clarity). The vibration isolator portion of a first isolated leg is coupled to a first side of the top plate and the vibration isolator portion of a second isolated leg, different than the first isolated leg, is coupled to a second side of the top plate, the second side opposite the first side.

As shown in FIGS. 5-8 and FIGS. 12-13, each isolated leg is coupled to a support platform. In one embodiment, each isolated leg is coupled to a mounting boss of the support platform. As a result, the isolated legs support the weight of the exhaust aftertreatment system and at least partially unload the flexible duct and the vertical exhaust outlet of the turbocharger. Said another way, the isolated legs allow for a greater portion of the weight of the exhaust aftertreatment system to be supported by the isolated legs instead of the flexible duct and turbocharger exhaust outlet. Decreasing the weight of the exhaust aftertreatment system applied to the exhaust outlet of the turbocharger may reduce degradation of and/or stress on the turbocharger, and further may increase stability of the exhaust aftertreatment system.

FIGS. 5-6 show a first embodiment where the support platform is the integrated front end 102 of the engine. The integrated front end may be part of the engine block. Further, as shown in FIG. 1, the integrated front end is positioned forward and away from cylinders (e.g., cylinder heads and valve covers) of the engine. In an alternate embodiment, the support platform may be another surface of the engine block. FIG. 5 shows a schematic 500 of a partial side view of the exhaust aftertreatment system of FIGS. 1 and 3-4 mounted vertically above the turbocharger with the associated support structure mounted to the integrated front end. FIG. 6 shows a schematic 600 of a front view of the exhaust aftertreatment system of FIGS. 1 and 3-4 mounted vertically above the turbocharger with the associated support structure mounted to the integrated front end.

The isolated legs 334 may be coupled between the catalyst array 320 of the exhaust aftertreatment system and the integrated front end. In this way, both and all isolated legs of the exhaust aftertreatment system are coupled to the integrated front end only and no additional portion of the engine block. As a result, all legs of the exhaust aftertreatment system are coupled to a single side of the engine block (e.g., front end), forward of all cylinder heads of the engine. As a result, the exhaust aftertreatment system only extends above the integrated front end and does not extend over any of the cylinder heads of the engine.

As described above, each isolated leg may include a vibration isolator portion 336 directly coupled to the catalyst array and a support member portion 340. The support member portion may include a plurality of support legs (or support members) 342 coupled between the vibration isolator portion and the integrated front end. Each isolated leg may include one or more support mounting platforms 354. In one embodiment, the support mounting platforms are coupled directly to a surface of the integrated front end. That is, they are without any additional components between the support mounting platforms and the integrated front end surface. In another embodiment, at least one of the support mounting platforms, or at least one of the support legs, is directly coupled to a mounting boss of the integrated front end. For example, as more clearly seen in FIG. 5, the integrated front end may include a mounting boss 510 for a coolant pipe support 502. A second end of a first support leg 504 is directly coupled to the mounting boss of the coolant pipe support. In another example, the second end of the first support leg is coupled to a support mounting platform which is directly coupled to the mounting boss of the coolant pipe support. The support structure may use existing mounting bosses of the integrated front end for mounting the support structure to the integrated front end.

As shown in FIG. 5, a first group of support legs of an isolated leg extend from the isolator mounting platform 352 to the support mounting platform. A second group of support legs of the same isolated leg extend from the isolator mounting platform to a point between the ends of another support leg extending from the isolator mounting platform to the support mounting platform. A third group of support legs of the same isolated leg extend from a point between the ends of another support leg extending from the isolator mounting platform to the support mounting platform and to the support mounting platform. As such, different support legs have different lengths based on their coupling origin and end point and the location of the corresponding support mounting platform on the integrated front end. In this way, the support legs may be oriented and coupled to one another to create a stable and strong support structure.

With reference to FIG. 6, a first isolated leg 344 is arranged on a first side of the turbocharger and a second isolated leg 346 is arranged on a second side of the turbocharger, the second side opposite the first side across a rotational axis of the turbocharger. The first isolated leg couples to and supports a first side of the exhaust aftertreatment system and the second isolated leg couples to and supports a second side of the exhaust aftertreatment system. Further, the support legs may be angled inward toward the turbocharger from the isolator portion to the support mounting platforms.

As discussed above, a vibration isolator 338 of the isolator portion of the isolated leg may include a spring or other resilient element that reduces the transmission of vibrations from the engine to the aftertreatment system. As a result, mechanical degradation of the exhaust aftertreatment system due to vibrations may be reduced.

FIGS. 7-8 show a second embodiment of the aftertreatment system support structure mounted to a housing of the turbocharger. FIG. 7 shows a schematic 700 of a side view of the exhaust aftertreatment system of FIGS. 1-4 mounted vertically above the turbocharger with the associated support structure mounted to the turbocharger housing. FIG. 8 shows a schematic 800 of a front view of the exhaust aftertreatment system of FIGS. 1-4 mounted vertically above the turbocharger with the associated support structure mounted to turbocharger housing. In some embodiments, the support structure may only be mounted to the turbocharger housing and to no other component of the engine. As a result, the exhaust aftertreatment system may be positioned vertically above only the turbocharger and offset from other parts of the engine, such as cylinder heads and cylinder head valve covers.

As shown in FIGS. 7-8, each isolated leg 334 may include a plurality of support legs, or support members 704, coupled to and extending between an isolator mounting platform 352 and a support mounting platform 354. The isolator mounting platform is coupled to the isolator portion 336 of the isolated leg. More specifically, the isolator mounting platform is coupled to two vibration isolators of the isolator portion. In alternate embodiments, each isolator portion of each isolated leg may include more or less than two vibration isolators. The support mounting platform is directly coupled to an outer surface of the turbocharger housing without any intervening components between the support mounting platform and the turbocharger housing.

The support members may be curved and curve inward toward the turbocharger from the isolator portion. As such, a plane of the support mounting platform may be rotated relative to a plane of the isolator mounting platform. For example, as shown in FIG. 8, the plane of the support mounting platform is rotated approximately 90 degrees from the plane of the isolator mounting platform. In an alternate embodiment, the plane of the support mounting platform may be rotated more or less than 90 degrees from the plane of the isolator mounting platform (e.g., 100 degrees). As shown in FIG. 7, each member portion of each isolated leg may include three support members. However, in alternate embodiments, each member portion may include more or less than three support members (e.g., four support members).

As shown in FIG. 8, a first isolated leg 802 is arranged on a first side of the turbocharger and a second isolated leg 804 is arranged on a second side of the turbocharger, the second side opposite the first side across a rotational axis of the turbocharger. Thus, the first isolated leg couples to and supports a first side of the exhaust aftertreatment system and the second isolated leg couples to and supports a second side of the exhaust aftertreatment system. Further, the support mounting platforms may be coupled to a top surface of the turbocharger, above the rotational axis of the turbocharger. This arrangement may allow for the support structure to mount to the turbocharger housing without interfering with additional engine components such as the coolant pipe. In alternate embodiments, the support mounting platforms may be coupled at an alternate location on the turbocharger housing such as a side or bottom portion of the turbocharger housing relative to the rotational axis of the turbocharger.

Figure 9:
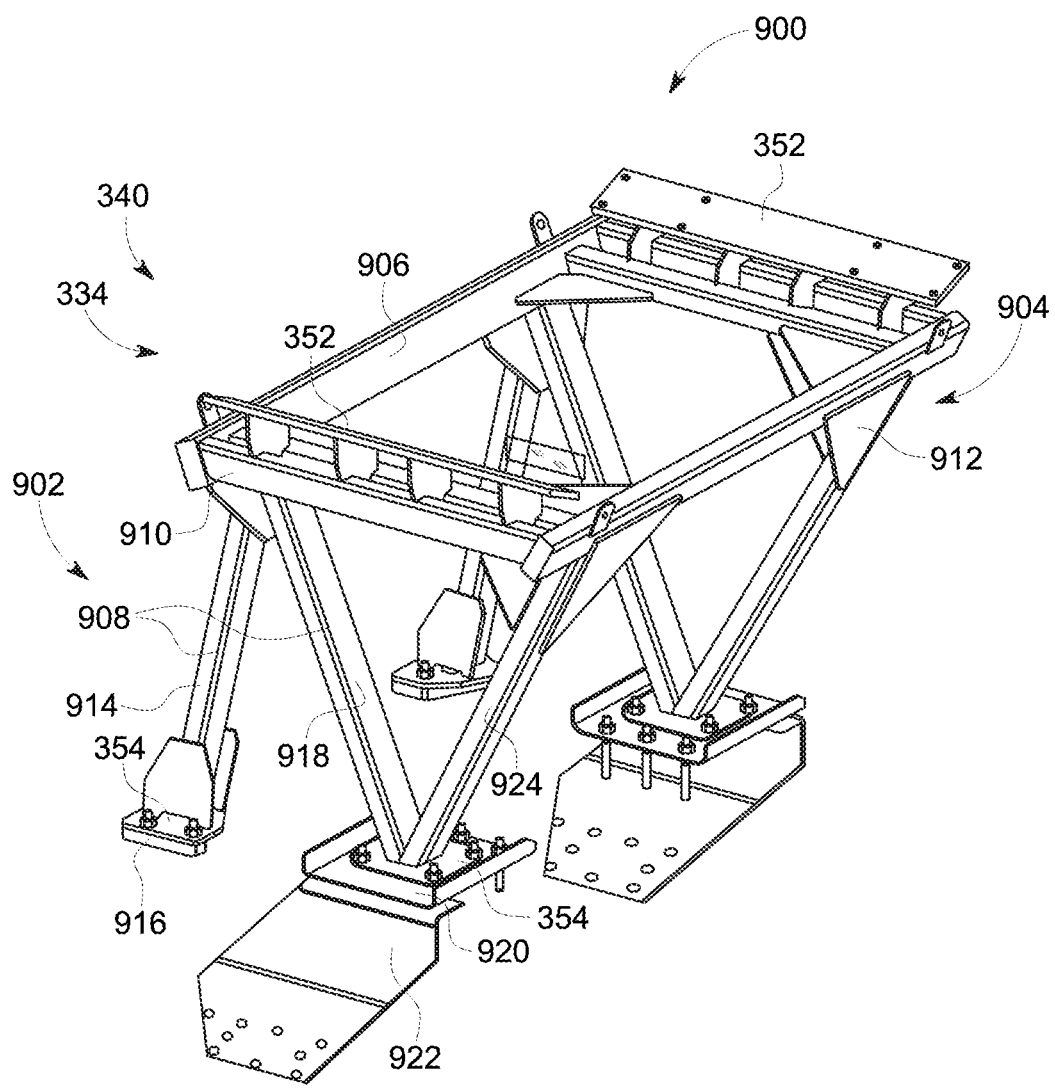
FIGS. 9-13 show a third embodiment of an exhaust aftertreatment system support structure according to an embodiment of the invention.
Figure 10:
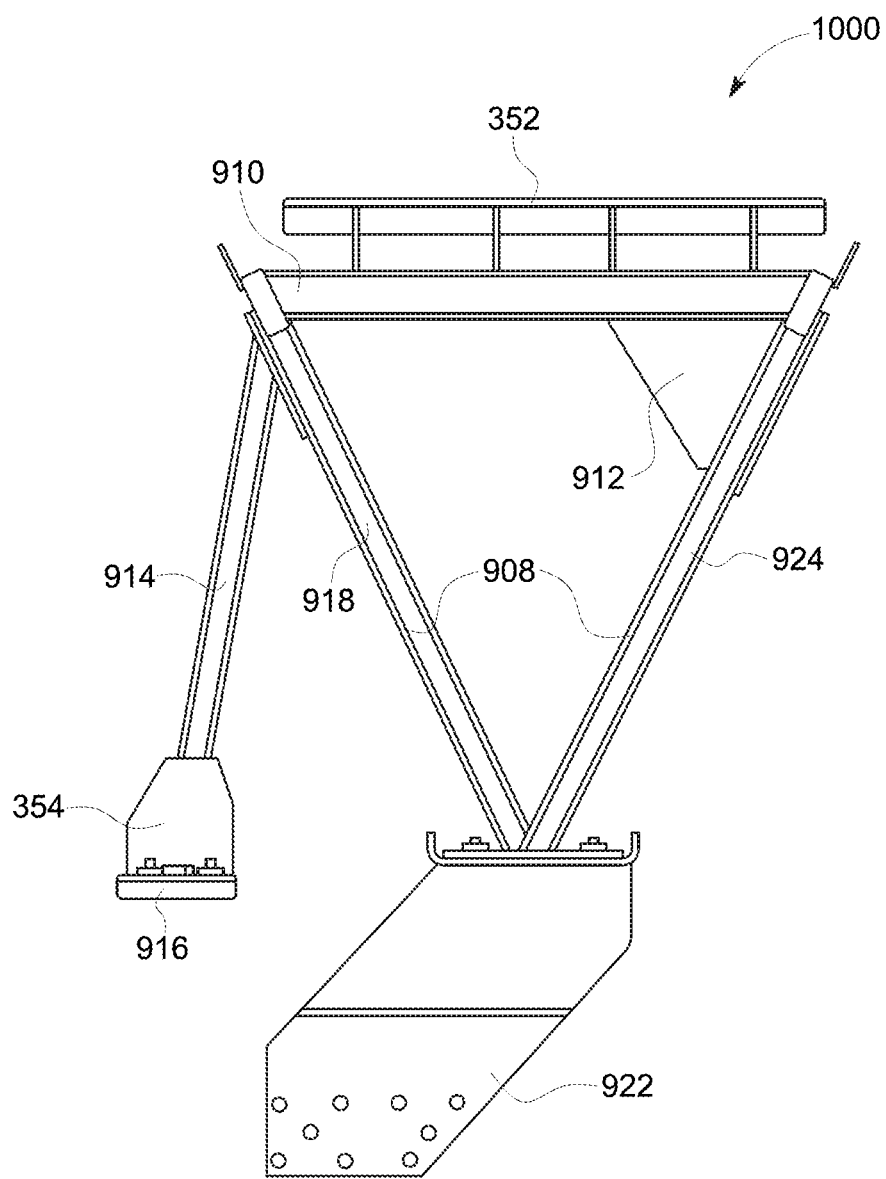
Figure 11:
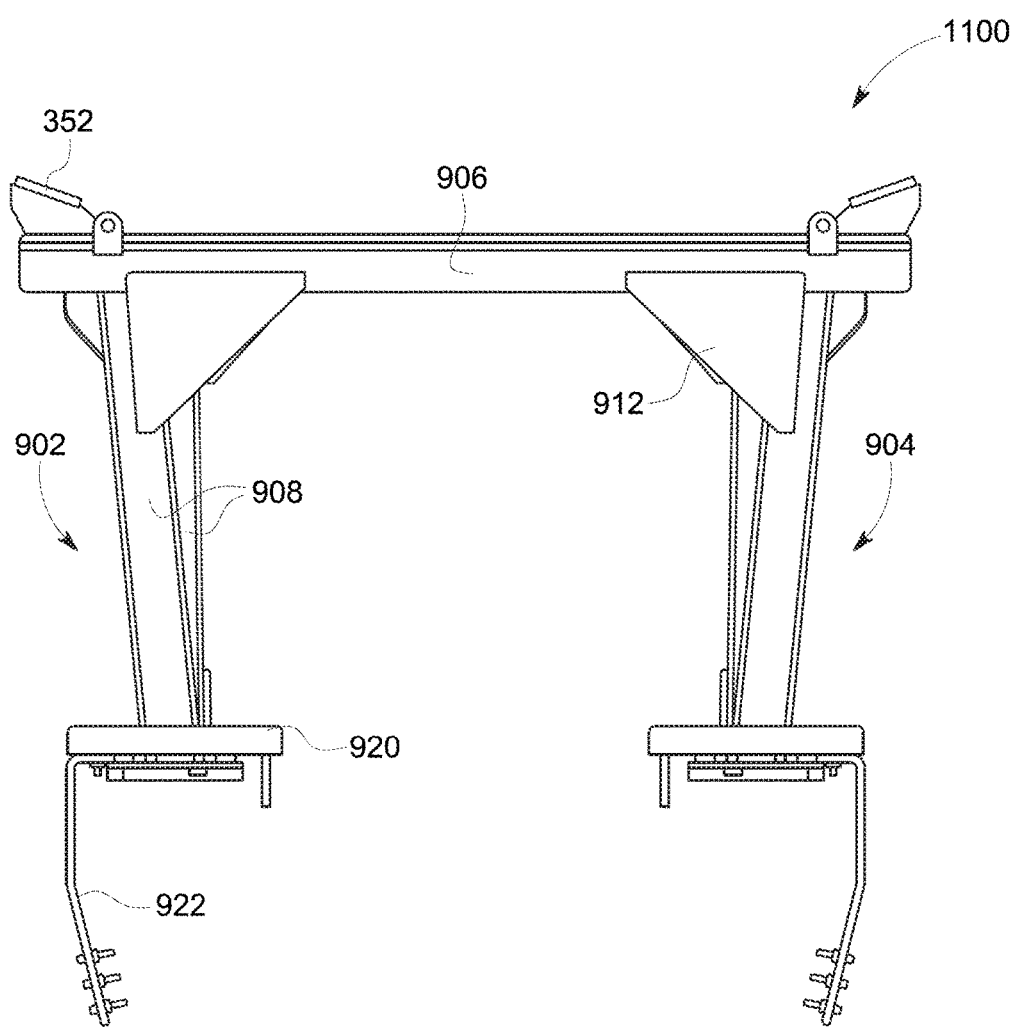
Figure 12:
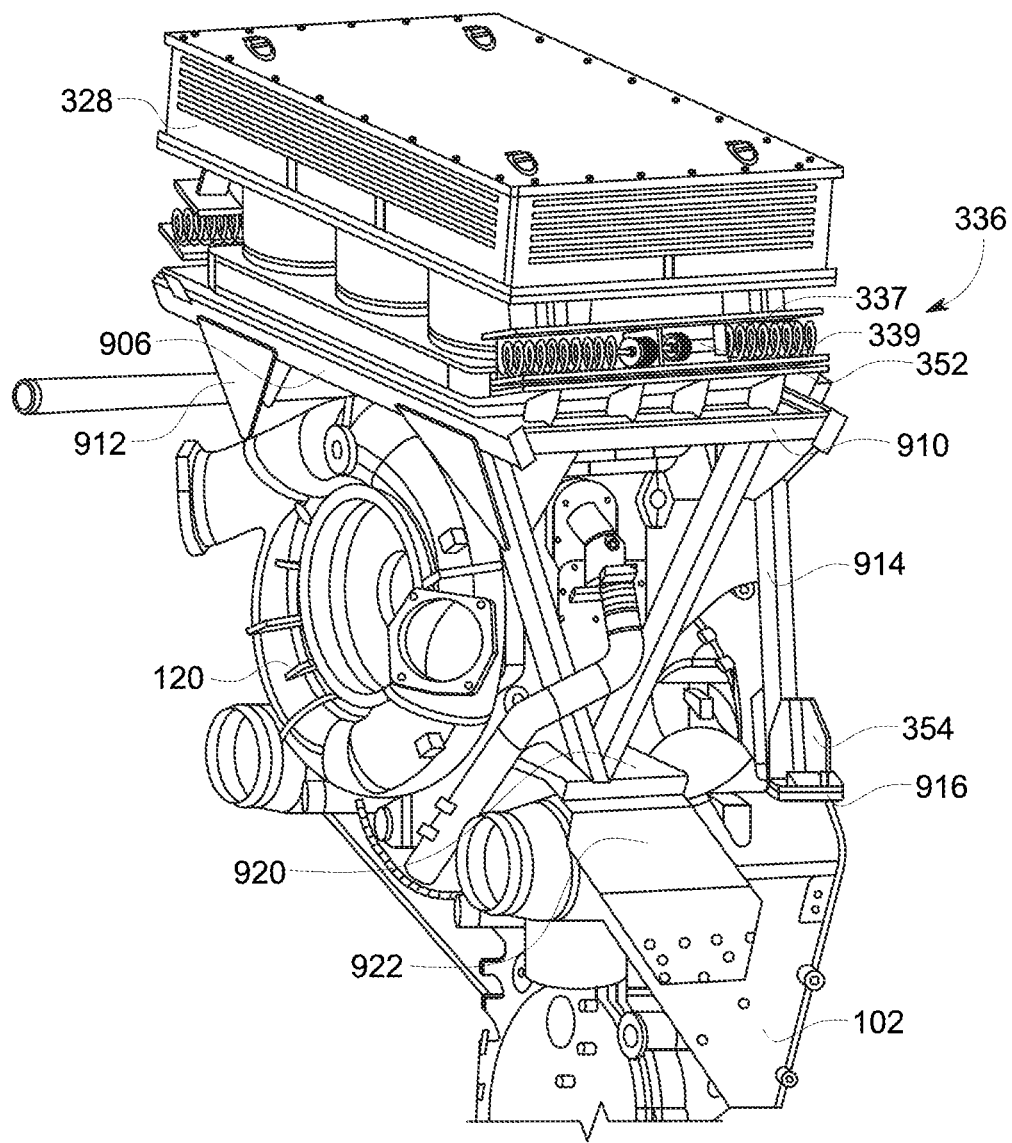
Figure 13:
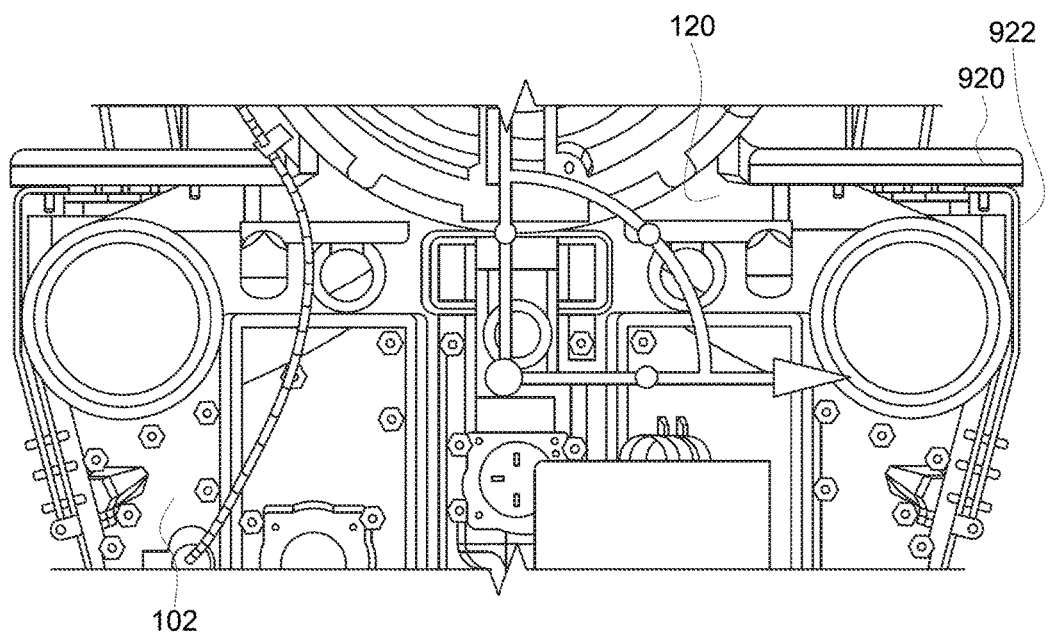

FIGS. 9-13 show a third embodiment of the exhaust aftertreatment system support structure. FIGS. 9-11 show detailed isometric, side, and front views, respectively, of the support structure. FIGS. 12-13 show schematics of the support structure of FIGS. 9-11 mounted to a support platform including the integrated front end and a portion of the turbocharger.

Turning to FIGS. 9-11, FIG. 9 shows a schematic 900 of an isometric view of a support structure, FIG. 10 shows a schematic 1000 of a side view of the support structure, and FIG. 11 shows a front view of a schematic 1100 of the support structure. More specifically, FIGS. 9-11 show the support member portion 340 of the isolated leg(s) 334 of the support structure. The support structure may include a first isolated leg 902 and a second isolated leg 904. The first isolated leg and second isolated leg are coupled to one another via a pair of angled side rails 906. In another embodiment, the support structure may be referred to as having a single isolated leg, the single isolated leg including the pair of side rails and the support legs 908. Along with a plurality of support legs, the isolated leg(s) may include two isolator mounting platforms 352. As shown in FIGS. 9-11, each isolated leg includes an isolator mounting platform, the two isolator mounting platforms arranged on opposite sides of the support structure. In an alternate embodiment, the support structure may include more or less than two isolator mounting platforms. Each isolator mounting platform may be coupled to a cross-rail 910, each cross-rail coupling each of the side rails to one another. Additionally, one or more support legs are coupled to the cross-rails and/or the side rails. In some embodiments, the cross-rails may be considered part of the isolator mounting platforms. In other embodiments, the cross-rails may be considered part of the support legs. The isolated legs may further include corner support brackets 912 coupling the cross-rails, side rails, and support legs to one another.

Each isolated leg includes a first support leg 914 coupled between a corner support bracket and a support mounting platform 354. The support mounting platform is coupled to a mounting pad 916. In some embodiments, the mounting pad may be part of the support mounting platform. The support mounting platform may include vertical side bracket walls surrounding an end of the first support leg. As shown in FIG. 12, described further below, the mounting pad is coupled directly to (e.g., via a plurality of fasteners) mounting bosses of the integrated front end, with no additional components between the mounting pad and the mounting boss of the integrated front end. In an alternate embodiment, the mounting pad is coupled directly to the integrated front end. Further, in some embodiments, the support mounting platform may be directly coupled to the mounting boss of the integrated front end.

A second support leg 918 of each isolated leg is coupled between the cross-rail and a support mounting platform. The support mounting platform is directly coupled to a top plate 920 and the top plate is directly coupled to a side plate 922. As shown in FIGS. 12-14, described further below, the side plate is directly coupled to side gussets of the integrated front end. In some embodiments, the support mounting platform may include the top plate and side plate. As shown in FIG. 11, the side plate has a horizontal mounting portion coupled to the top plate. The side plate also includes a vertical portion extending downward and away from the horizontal portion. Finally, the side plate has an angled portion angled downward and inward towards a center of the support structure. The shape and angling of the vertical and angled portions of the side plate may be selected for mounting to the side gussets of the integrated front end. For example, the side plate includes a plurality of fasteners at a bottom of the angled portion for coupling the side plate to the side gussets of the integrated front end.

A third support leg 924 of each isolated leg is coupled between one or more of the cross-rail, side rail, and corner support bracket and the same support mounting platform that the second support leg is coupled to. In this way, the first, second and third support legs provide a truss-like support structure. In other embodiments, each isolated leg may include more or less than three support legs.

As shown in FIGS. 12-13, the support structure is mounted on a support platform, the support platform including at least the integrated front end 102 of the engine. Specifically, the side plates 922 coupled to the mounting platforms 354 couple directly to a side of the integrated front end without any additional components in between the side plates and the integrated front end. The integrated front end may include side gussets and the side plates may then fasten directly via a plurality of fasteners (e.g., bolts), to the side gussets. The side plates are angled to conform to an angled shape of the integrated front end. Each top plate 920 is coupled directly to a joint between the integrated front end and the turbocharger 120. The side plates may include a larger surface area for coupling to the integrated front end. The combination of mounting the support structure to the integrated front end via the side plates and the top plates may result in a more durable coupling providing increased support to the exhaust aftertreatment system.

Further, FIG. 12 shows an alternate arrangement of the vibration isolator portion 336 coupled to the isolator mounting plate 352. As shown in FIG. 12, the vibration isolator portion includes a spring isolator 337 positioned between two wire-rope isolators 339. The spring isolator and the two wire-rope isolators are coupled between two coupling platforms. As described above with reference to FIGS. 3-4, the coupling platforms and isolators are angled and provide dampening in all three planes of movement. The vibration isolator portion shown in FIG. 12 may be included in any of the support structure embodiments shown in FIGS. 3-8.

FIGS. 3-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the exhaust aftertreatment system and support structure of FIGS. 1-8 provide for an exhaust aftertreatment system mountable vertically above a turbocharger. Specifically, the exhaust aftertreatment system is mountable to a vertical exhaust outlet of the turbocharger and fits within a space defined between a top of the engine and a top and sides of a standard engine cab. In one example, the exhaust aftertreatment system may be a replacement for a horizontally arranged aftertreatment system. As described above, more stringent emissions requirements may require an aftertreatment system with increased catalyst capacity. Current horizontally arranged aftertreatment systems (e.g., arranged along a length of the engine block instead of primarily vertically above the turbocharger) may not be able to accommodate the increased catalyst capacity within the standard engine cab and increasing the size of the engine cab may not be desirable.

Thus, the exhaust aftertreatment system and support structure of FIGS. 3-8 provide for an exhaust aftertreatment system that fits within an available packaging space defined by a standard-size engine cab and engine. The exhaust aftertreatment system may be mounted vertically above the turbocharger. The volume used to contain the aftertreatment system may be in a space that may have been occupied by a muffler. Alternatively, the muffler and aftertreatment system may be combined as an integrated unit. Further, a smaller muffler may be used in conjunction with the aftertreatment system so as to maintain the volume footprint. And, the aftertreatment system and/or muffler (if present) may be arranged so that at least a portion of the one or the other extends further from, and is outside of, the cab. Such configurations may be suited for use with engines having a horizontally arranged exhaust aftertreatment system.

Along with fitting within the existing engine cab, the exhaust aftertreatment system of FIGS. 3-8 may provide sound attenuation. For example, the catalyst array of the exhaust aftertreatment system may reduce noise by including a series of baffles and/or sound dampeners. Additionally, the catalysts within the catalyst array provide the required emissions reductions. For example, the number of catalysts within the catalyst array may be based on an emissions target or a set emissions standard.

The exhaust aftertreatment system described above allows for all, or nearly all, all of the treated exhaust to be ducted outside of the engine cab. In one embodiment, treated exhaust flows may have a portion routed back to the engine for use in an exhaust gas recirculation (EGR) system. The vertical mounting of the aftertreatment system and the positioning of the aftertreatment outlet manifold relative to a top of the engine cab allow for the treated exhaust to be vented outside of the engine cab. For example, the vents in the sidewalls of the aftertreatment outlet manifold may be positioned above a cut-out in a top of the engine cab. The cover covering a top of the aftertreatment outlet manifold protects the exhaust aftertreatment system from exterior elements while still ducting exhaust outside the engine cab. For example, the cover may reduce degradation of the aftertreatment system components from rain, snow, or the like.

As described above, the support structure allows at least a portion of the weight of the exhaust aftertreatment system to be supported by the engine block (e.g., integrated front end) and/or the turbocharger housing instead of the vertical exhaust outlet of the turbocharger alone. In this way, degradation of, or stress on, the turbocharger may be reduced. Additionally, the isolator portions of the isolated legs of the support structure provide vibration isolation, thereby reducing degradation of the exhaust aftertreatment system. For example, the isolator portions may reduce the translation of vibrations and shock waves from the engine to the aftertreatment system.

In one embodiment, an exhaust aftertreatment system comprises a support platform; one or more isolated legs coupled to the support platform; one or more catalysts disposed above the support platform by the one or more isolated legs; and an aftertreatment outlet manifold coupled to and disposed above the one more catalysts. The aftertreatment outlet manifold is substantially rectangular and defines one or more horizontal vents aligned along sidewalls of the aftertreatment outlet manifold. The exhaust aftertreatment system further comprises a solid cover coupled to a top surface of the aftertreatment outlet manifold. The one or more catalysts are arranged in parallel with one another, and are disposed between a top plate and a bottom plate to form a vertical catalyst array. Additionally, the exhaust aftertreatment system includes a transition piece coupled to the bottom plate and a flexible duct coupled to a bottom of the transition piece, the flexible duct coupleable to an exhaust source and the transition piece adapted to route exhaust to each of the one or more catalysts. Each of the one or more isolated legs includes a vibration isolator portion and a support member portion, where a first end of each vibration isolator portion is coupled to the bottom plate and a second end of each vibration isolator portion is coupled to the support member portion, the support member portion including one or more support legs. The first end of each vibration isolator portion is directly coupled to a bottom face of the top plate of the vertical catalyst array. Additionally, the vibration isolator portion of a first isolated leg of a plurality of isolated legs is coupled to a first side of the top plate and the vibration isolator portion of a second isolated leg of the plurality of isolated legs is coupled to a second side of the top plate, the second side opposite the first side. Each isolator portion includes at least one vibration isolator positioned between two coupling platforms. In one example, the aftertreatment outlet manifold is directly coupled to a top face of the top plate of the vertical catalyst array along an outer perimeter of the top plate. Further, the one or more catalysts include six hexagonally shaped oxidation catalyst canisters which are vertically aligned within an array to pass airflow through the one or more catalysts and to the aftertreatment outlet manifold.

In another embodiment, a kit comprises a catalyst array including one or more catalysts; an aftertreatment outlet manifold including a cover and vents positioned in sidewalls of the aftertreatment outlet manifold; a first isolated leg including one or more vibration isolators and one or more support legs; and a second isolated leg including one or more vibration isolators and one or more support legs. The first and second isolated legs are configured to couple to an engine, or a turbocharger for the engine, via their respective support legs and thereby to support the aftertreatment outlet manifold and to isolate the aftertreatment outlet manifold from vibration. The catalyst array includes a top mounting plate and a bottom mounting plate and the one or more catalysts are positioned in parallel with one another between the top mounting plate and the bottom mounting plate and spaced away from outer edges of the top mounting plate and the bottom mounting plate. The aftertreatment outlet manifold is substantially rectangular with four sidewalls, where only three of the four sidewalls include the vents and where a bottom of the aftertreatment outlet manifold includes one or more mounting apertures adapted to be coupled to the top mounting plate of the catalyst array. Each of the one or more vibration isolators of the first isolated leg and the second isolated leg includes a catalyst array mounting platform adapted to be coupled to the top mounting plate of the catalyst array. Additionally, each of the one or more support legs of the first isolated leg and the second isolated leg includes a support mounting platform. The kit further comprises a flexible duct including a first mounting flange around a bottom perimeter of the flexible duct and a second mounting flange around a top perimeter of the flexible duct, the first mounting flange adapted to be coupled to a muffler mounting platform of an outlet of a turbocharger. Further still, the kit comprises a transition piece including a top mounting surface around a perimeter of the transition piece and an interior mounting flange, the top mounting surface adapted to be coupled to the bottom mounting plate of the catalyst array and the interior mounting flange adapted to be coupled to the second mounting flange of the flexible duct.

In yet another embodiment, a vehicle comprises an engine cab defined by a roof assembly and side walls; an engine positioned in the engine cab such that a longitudinal axis of the engine is aligned in parallel with a length of the engine cab, the engine including an integrated front end; a turbocharger coupled to the engine and mounted to the integrated front end, the turbocharger having a vertical exhaust outlet with respect to the longitudinal axis; and an exhaust aftertreatment system mounted vertically above the turbocharger within a space defined by a top surface of the turbocharger, the roof assembly, and the side walls of the engine cab such that a longitudinal axis of the exhaust gas treatment system is aligned perpendicular to the longitudinal axis of the engine. The exhaust aftertreatment system comprises a catalyst array including a plurality of catalysts arranged in parallel with one another along the longitudinal axis of the exhaust gas aftertreatment system and an aftertreatment outlet manifold coupled vertically above the catalyst array and adapted to duct exhaust outside the engine cab. The vehicle further comprises a support structure including a plurality of isolated legs coupled at a first end of each of the plurality of isolated legs to the catalyst array and coupled at a second end of each of the plurality of isolated legs to one of the integrated front end or a housing of the turbocharger, and thereby to support the exhaust aftertreatment system and to isolate the exhaust aftertreatment system from vibration originated by the engine. The exhaust aftertreatment system further comprises a flexible duct coupled to the vertical exhaust outlet of the turbocharger. Additionally, the catalyst array is coupled vertically above the flexible duct through a transition piece. Further, the exhaust aftertreatment system comprises a cover coupled to a top surface of sidewalls of the aftertreatment outlet manifold. The aftertreatment outlet manifold includes a plurality of horizontal vents positioned in the sidewalls of the aftertreatment outlet manifold. Additionally, the roof assembly of the engine cab includes a cut-out for a portion of the exhaust aftertreatment system to pass through and the aftertreatment outlet manifold is positioned outside of and vertically above a top surface of the roof assembly. The plurality of isolated legs includes a plurality of vibration isolators coupled to a plurality of support legs, the support legs coupled to one or more mounting bosses on the integrated front end or housing of the turbocharger. In one example, the second end of one of the plurality of isolated legs is coupled to a corresponding mounting boss of a coolant pipe support.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An exhaust aftertreatment system, comprising:
   an inlet coupleable to an exhaust source;
   a catalyst array coupled vertically above the inlet and including at least two catalysts arranged vertically within the array such that catalyst inlets and outlets of the at least two catalysts are arranged in parallel with one another; and
   an outlet manifold coupled vertically above the catalyst array and configured to expel exhaust gases out of the exhaust aftertreatment system, where the inlet, catalyst array, and outlet manifold are all stacked vertically in-line with one another and share a common longitudinal axis, where a direction of exhaust gas flow through the inlet, catalyst array, and into the outlet manifold is parallel to the longitudinal axis;

wherein the catalyst array includes a top mounting plate and a bottom mounting plate, wherein the catalyst inlets of the at least two catalysts are positioned in the bottom mounting plate and the catalyst outlets of the at least two catalysts are positioned in the top mounting plate, and wherein the at least two catalysts are spaced away from outer edges of the top mounting plate and the bottom mounting plate.

2. The exhaust aftertreatment system of claim 1, wherein at least one catalyst of the catalyst array is a catalyst configured to oxidize hydrocarbons in the exhaust gas flow passing through the exhaust aftertreatment system to carbon dioxide.

3. The exhaust aftertreatment system of claim 1, wherein the outlet manifold is substantially rectangular and includes four sidewalls and a cover, wherein at least one of the sidewalls includes a vent and wherein a bottom of the aftertreatment outlet manifold is directly coupled to the top mounting plate of the catalyst array.

4. The exhaust aftertreatment system of claim 1, further comprising a first isolated leg including one or more first vibration isolators and one or more first support legs and a second isolated leg including one or more second vibration isolators and one or more second support legs, wherein each of the one or more first vibration isolators of the first isolated leg and the one or more second vibration isolators of the second isolated leg includes a catalyst array mounting platform coupled to the top mounting plate of the catalyst array, and wherein each of the one or more first support legs of the first isolated leg and the one or more second support legs of the second isolated leg includes a support mounting platform.

5. A system for a vehicle, comprising:
an engine cab defined by a roof assembly and side walls;
an engine positioned in the engine cab such that a first longitudinal axis of the engine is aligned in parallel with a length of the engine cab, the engine including an integrated front end;
a turbocharger operably coupled to the engine and mounted to the integrated front end, the turbocharger having a vertical exhaust outlet arranged perpendicular to the first longitudinal axis; and
an exhaust aftertreatment system coupled to the vertical exhaust outlet and mounted vertically above the turbocharger within a space defined by a top surface of the turbocharger, the roof assembly, and the side walls of the engine cab such that a second longitudinal axis of the exhaust gas treatment system is aligned perpendicular to the first longitudinal axis of the engine, where a direction of exhaust gas flow through the exhaust aftertreatment system is parallel to the second longitudinal axis, and where the vertical exhaust outlet is centered along the second longitudinal axis, the exhaust aftertreatment system comprising:
a catalyst array including a plurality of catalysts arranged in parallel with one another and the second longitudinal axis; and
an aftertreatment outlet manifold coupled vertically above the catalyst array, centered along the second longitudinal axis, and adapted to duct exhaust outside the engine cab.

6. The system of claim 5, wherein the exhaust aftertreatment system further comprises a support structure including a plurality of isolated legs coupled at a first end of each of the plurality of isolated legs to the catalyst array and coupled at a second end of each of the plurality of isolated legs to one of the integrated front end or a housing of the turbocharger.

7. The system of claim 5, wherein the engine includes a plurality of cylinder heads arranged along the first longitudinal axis of the engine, and wherein the exhaust aftertreatment system is arranged forward of all cylinder heads of the plurality of cylinder heads, relative to the integrated front end, the exhaust aftertreatment system extending over only the integrated front end and not over any of the cylinder heads.

8. The system of claim 5, wherein the exhaust aftertreatment system further comprises a flexible duct directly coupled to the vertical exhaust outlet of the turbocharger and wherein the catalyst array is coupled vertically above the flexible duct through a transition piece, the transition piece and flexible duct centered along the second longitudinal axis.

9. The system of claim 5, wherein the exhaust aftertreatment system further comprises a cover coupled to a top surface of sidewalls of the aftertreatment outlet manifold and wherein the aftertreatment outlet manifold includes a plurality of horizontal vents positioned in the sidewalls of the aftertreatment outlet manifold.

10. The system of claim 5, wherein the roof assembly of the engine cab includes a cut-out for a portion of the exhaust aftertreatment system to pass through and wherein the aftertreatment outlet manifold is positioned outside of and vertically above a top surface of the roof assembly.

\* \* \* \* \*